US006409449B1

United States Patent
Freudelsperger et al.

(10) Patent No.: US 6,409,449 B1
(45) Date of Patent: Jun. 25, 2002

(54) COMMISSIONING SYSTEM WITH A HIGH-SPEED AUTOMATIC MACHINE AND A SHELF CONTROL UNIT

(75) Inventors: Karl Freudelsperger, Hart bei Graz (AT); Manfred Preiss, Rosstal (DE)

(73) Assignee: Knapp Logistik Automation GmbH (AT)

( * ) Notice: Subject to any disclaimer, the term of this patent is extended or adjusted under 35 U.S.C. 154(b) by 0 days.

(21) Appl. No.: 09/424,284

(22) PCT Filed: Nov. 17, 1999

(86) PCT No.: PCT/DE99/00847

§ 371 (c)(1),
(2), (4) Date: Nov. 19, 1999

(87) PCT Pub. No.: WO99/47435

PCT Pub. Date: Sep. 23, 1999

(30) Foreign Application Priority Data

Mar. 20, 1998 (DE) .......................................... 198 12 147

(51) Int. Cl.[7] ................................................. B65G 1/04
(52) U.S. Cl. .................... 414/276; 414/798.9; 414/280; 414/283; 414/808; 221/12
(58) Field of Search ......................... 414/416.03, 790.3, 414/222.13, 276, 280, 808, 806, 222.04, 283, 222.1, 416.01, 798.9; 221/12, 198, 251, 252, 208

(56) References Cited

U.S. PATENT DOCUMENTS 3,750,804 A * 8/1973 Lemelson .................... 414/276
4,251,177 A * 2/1981 Neuhaeusser et al. ...... 414/276
4,560,314 A * 12/1985 Fohler ......................... 414/276
5,993,132 A * 11/1999 Harres et al. ........... 414/276 X

FOREIGN PATENT DOCUMENTS

GB 2118156 A * 10/1983 ................. 414/276
RU 1507682 * 9/1989 ................. 414/280

* cited by examiner

Primary Examiner—Frank E. Werner
(74) Attorney, Agent, or Firm—McGlew and Tuttle, P.C.

(57) ABSTRACT

The invention relates to a commissioning system (1) with at least one high-speed automatic machine (2) which comprises at least one article shelf (3) with article shafts (4) which are adjacently and essentially vertically arranged, preferably in a slightly slanted manner, and which can be accessed from the front. Articles which are to be commissioned can be stored in said article shafts, whereby a shelf control unit (5) can travel and which is assigned to the article shelf can be positioned at each article shaft (4) and stores articles in said article shaft. According to the invention, the spatially moveable shelf control unit (5) is equipped with an article handling unit (6) which stores the articles of the same type or dimensions in a stacked manner without the use of a magazine, whereby an article stack (7) which is to be stored in. Simultaneously handled without a separate article stack magazine or receptacle by the shelf control unit.

16 Claims, 19 Drawing Sheets

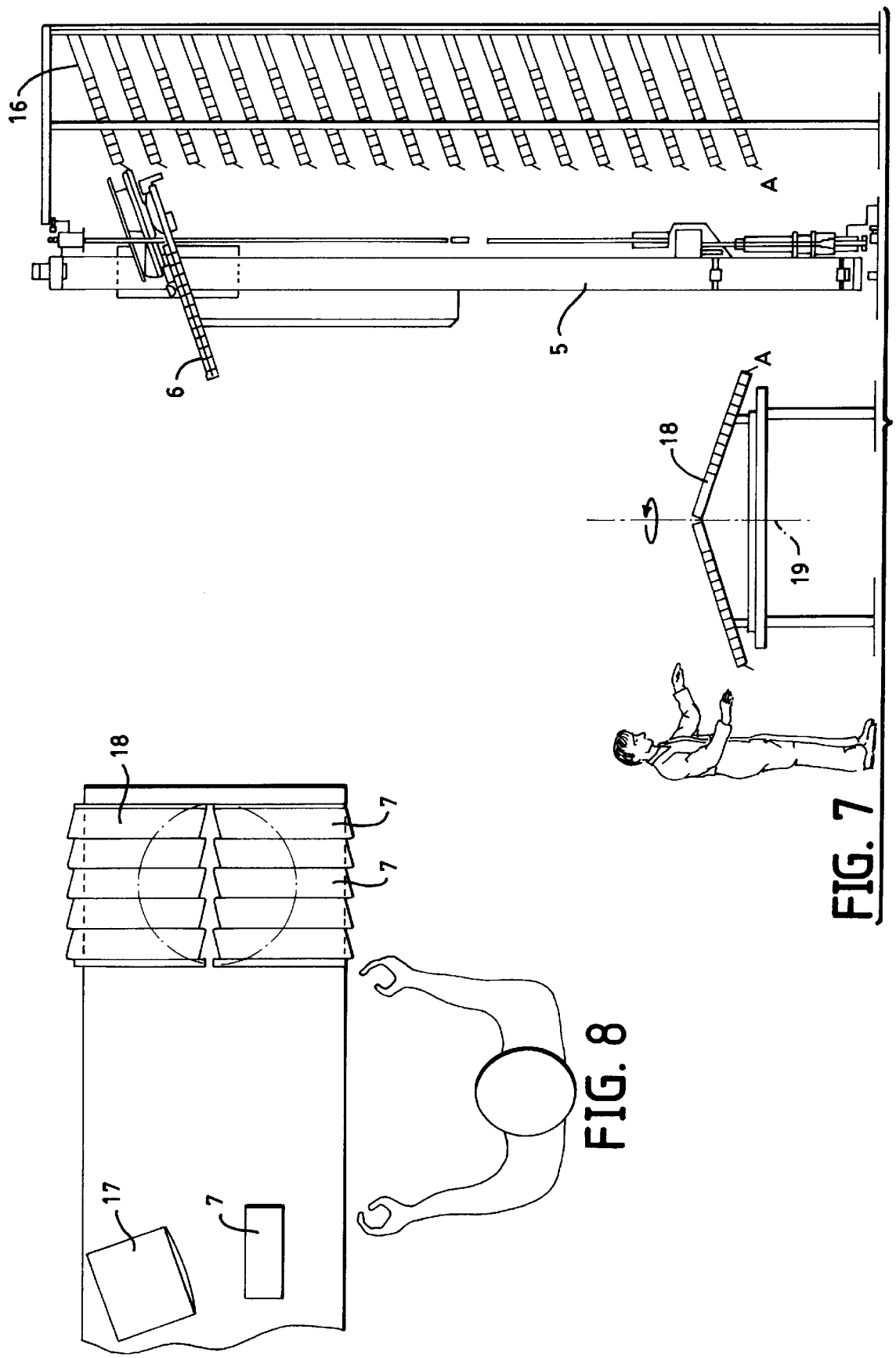

COMMISSIONING SYSTEM WITH A HIGH-SPEED AUTOMATIC MACHINE AND A SHELF CONTROL UNIT

FIELD OF THE INVENTION

The present invention pertains to a commissioning unit with at least one high-speed automatic turning unit, which has at least one article bay with essentially vertical, preferably gently sloping article shafts, which are arranged next to one another, are accessible from the front, and in which articles to be commissioned can be stored, wherein a traveling bay-storage and retrieval unit associated with the article bay can be positioned at each article shaft and it loads articles into the article shaft. The present invention also pertains to a process for providing and storing articles in a commissioning unit, preferably one of the above-mentioned type.

BACKGROUND OF THE INVENTION

The filling shafts of automatic commissioning units have hitherto been loaded with new articles mainly manually. The operation is comparatively expensive and time-consuming. To save costs and time, a prior-art commissioning unit provides for automatic loading by means of a bay-storage and retrieval unit according to DE 297 03 230, by means of which articles can be pushed from the lower end of the filling shaft into a filling shaft inclined in relation to the horizontal. This type of loading of the filling shaft is unsuitable for vertical or quasi-vertical filling shafts, because the filling shaft is loaded with the total weight of the stack in this case and the stack already present would have to be pushed upward.

Furthermore, the filling shaft is loaded from the top in the case of vertical or nearly vertical filling shafts accessible from the front. To make it possible to perform this expediently by means of an automatic unit, provisions are made according to EP 0 794 135 to load not only a single article, but even an entire stack of articles at the same time by means of an automatic unit. The stack of articles is handled now in a special box-like magazine with an elongated hole in a longitudinal side wall. The magazine serves the purpose of consistently keeping together the stack of articles, doing so from the loading site at the acceptance department to the loading operation proper. The magazine is adapted to the shape of the articles and the plurality of stacked articles. After a loading operation in the high-speed automatic turning unit, the empty magazine is returned to the acceptance department for being filled again with articles.

SUMMARY AND OBJECTS OF THE INVENTION

The object of the present invention is to provide a commissioning unit of the type described in the introduction, which makes it possible with simple means to efficiently load articles into the high-speed automatic turning unit and optionally to keep ready articles to be loaded in an expedient manner.

According to the invention, a commissioning system is provided with with at least one high-speed automatic turning unit, which has at least one article bay with essentially vertical, preferably gently sloping, article shafts, which are arranged next to one another, are accessible from the front and in which articles to be commissioned can be stored. The traveling bay-storage and retrieval unit associated with the article bay can be positioned at each article bay and it loads articles into the article shaft. The bay-storage and retrieval unit is movable in space and has an article-handling unit, which loads articles of the same brand and dimension stack by stack without a magazine, wherein a stack of articles to be loaded is handled by the bay-storage and retrieval unit simultaneously without a separate stack-of-articles magazine or container. The article-handling unit has a bottom-side stack-of-articles pick-up, an adjustable longitudinal stack-of-articles pusher, an adjustable transverse stack-of-articles pusher and an adjustable longitudinal stack-of-articles clamping plate provided especially with a row of the spring-tensioned fingers. The clamping plate is located in parallel and opposite the stack-of-articles pick-up and pushes in the clamped state a stack of articles picked up directly by the longitudinal stack-of-articles clamping plate, especially by the spring-tensioned fingers of the clamping plate, in the transverse direction (Q) of the stack against the stack-of-articles pick-up.

According to another aspect of the invention, a process for providing and loading articles in a commissioning unit with at least one high-speed automatic turning unit. The turning unit has at least one article bay with, essentially vertical, preferably gently sloping article shafts, which are arranged next to one another, are accessible from the front and in which articles to be commissioned can be stored. At least one traveling bay-storage and retrieval unit associated with the article bay can be positioned at each article shaft and can load articles into the article shaft, especially during the operation of a commissioning unit. Articles of the same brand and size can be removed by the bay-storage movable in space and retrieval unit from a supply bay or from a stack-of-articles stacker plate at the acceptance department in a stack prepacked there essentially by the horizontal displacement of the stack of articles in the longitudinal direction of the stack, preferably gently sloping downward in the longitudinal direction toward the bay-storage and retrieval unit and gently sloping laterally in the transverse direction against a stop (and be optionally loaded again at another supply bay). The stack of articles removed is transferred by the bay-storage and retrieval unit essentially in horizontal arrangement on the bay-storage and retrieval unit to the high-speed automatic turning unit, and the stack of articles is clamped there in the transverse direction of the stack directly in a stack of articles handling unit before the (vertical) positioning of a stack of articles at a selected article shaft. After positioning in the deposition position, the clamped stack of articles is released from or pushed out of the clamping in a selected shaft of the high-speed automatic turning unit.

The essence of the present invention is that the bay-storage and retrieval unit, which is movable in space, has an article-handling unit, which stores articles of the same brand or dimension in stacks without magazine, wherein a stack of articles to be stored is handled by the bay-storage and retrieval unit simultaneously without a separate stack-of-articles magazine or container and the article-handling unit has a bottom-side stack-of-articles pick-up, an adjustable longitudinal stack-of-articles pusher, an adjustable transverse stack-of-articles pusher and an adjustable longitudinal stack-of-articles clamping plate, which said clamping plate has, in particular, a row of spring-tensioned fingers and which is located in parallel to and opposite the stack-of-articles pick-up and which presses in the clamped state a stack of articles picked up directly by the longitudinal stack-of-articles clamping plate, especially its spring-tensioned fingers, against the stack-of-articles pick-up in the transverse direction of the stack.

Instead of the spring-tensioned fingers, it is also possible to provide other clamping means, which ensure the local clamping of every single article in the stack of articles, e.g., a flexible, resilient clamping strip.

The bay-storage and retrieval unit is preferably able to travel from and to at least one supply bay by means of a guide or rail system with or without switches, and it can be positioned at a selected lateral end of a shaft of the storage bay, especially of an angle sheet iron, wherein a single stack of articles to be handled is or can be arranged in each selected shaft and the stack of articles reaches an aligned article pick-up of the article-handling unit by being pushed in the direction of the stack or conversely, it reaches the selected shaft from the article support.

In the case of small products, two stacks of articles may also be optionally stored in a single shaft, in which case these stacks of articles will be parallel ("multiple load support").

The supply bay may be a higher-level supply bay, which is associated with the high-speed automatic turning unit and is preferably located in the vicinity t the article bay of the high-speed automatic turning unit.

However, the supply bay may also be a buffer, which is associated with the acceptance department and is preferably located in the vicinity of the unpacking station, at which the stacks of articles are unpacked from a collective box and are put together.

Depending on the size of the commissioning unit and local space conditions, both one or more higher-level supply bays as well as one or more buffers are preferred, and a plurality of high-speed automatic turning units may be present as well.

The commissioning unit according to the present invention can consequently be designed within broad limits as desired and, in particular, it can also be expanded in the future without difficulties.

The unpacked stacks of articles are expediently put together on a stack-of-articles stacker plate, which has the shape of a part of at least one bay level of the supply bay, and is formed especially by angle sheet irons, wherein the bay-storage and retrieval unit can also be transferred to the stack-of-articles stacker plate by displacement via the rail or guide system for taking over a stack of articles and it can be positioned at the stack-of-articles stacker plate, especially at a lateral end of an angle sheet iron.

For positioning at the bay-storage and retrieval unit, the stack-of-articles stacker plate may also be displaceable, especially on a conveyor belt or on a chute and/or be rotatable around a vertical axis preferably over an angle of 90° or 180°.

The stack-of-articles stacker plate may also be a vertically adjustable bay with drawers that can be pulled out, which can be operated manually or automatically.

A hand or foot switch may be optionally actuated by a human operator for adjusting the stack-of-articles stacker plate.

The commissioning unit may also be designed as a fully automatic unit such that an automatic unpacking unit with a gripping arm, which grasps a preferably horizontal stack of articles from an opened higher-level box and deposits it on the stack-of-articles stacker plate, is provided on the acceptance department side.

The opening and delivery of the higher-level box may optionally also be performed by means of a machine.

A supply bay of a particularly expedient design has one or more levels of angle sheet irons arranged next to one another, which levels are arranged one on top of another.

Each angle sheet iron may extend horizontally, but it is bent twice in a manner that is to be pointed out in particular, such that a groove is formed, which has a rectangular cross section and is oblique in the longitudinal direction, wherein the root of the angle is located at the lowest point in each longitudinal cross section of the groove and both surfaces of the legs of the angle are stop faces for a stack of articles picked up, and, furthermore, a detachable, preferably depressible article stop is provided at the deepest end of the groove.

The detachable article stop may be actuated not only remotely, but it may also be self-actuated, e.g., by a magnet. The article stop may also be rigid. In this case, the articles are lifted over with a suitable device during a displacement of a stack of articles.

In one variant of the present invention, the slope of the groove is about 20° in the longitudinal direction and about 15° in the transverse direction. The more oblique the slope of the groove in the longitudinal direction, the greater is the independent slidability of the stack of articles in the groove. It was found that with the above-mentioned slope, a stack of articles is held in practical operation under stable conditions advantageously on the rear side and the top side with a rolling cart and it slides satisfactorily in the groove when a stack of articles is displaced in the system of the commissioning unit. The transverse slope of 15° always fixes a stack of articles in the angle root of the groove.

Consequently, a longitudinal fixing aid, which pushes the stack of articles against the article stop, may be provided in the groove.

The longitudinal fixing aid is expediently the rolling cart, a longitudinally adjustable, driven article stop or a spring-pretensioned article stop.

It shall be pointed out that different article sizes can be held in a fixed manner as a stack in the angle root in the above-mentioned groove sloping doubly at an angle. A cubic shape is sufficient. Thus, a single angle sheet iron may be used for different articles without the entire unit having to be converted.

The supply bay may also be a space-saving double bay, which is arranged back to back.

The article-handling unit of the bay-storage and retrieval unit expediently has a coupling pin, which can be caused to engage as a centering aid a corresponding recess in a selected shaft of a supply bay.

The article-handling unit may also have a stop, especially a small roller, which can be caused to engage the stack-of-articles stop of a shaft for releasing or depressing the stack-of-articles stop, wherein the stop of the article-handling unit may also be the adjustable longitudinal pusher itself.

A commissioning unit that makes do without separate magazines for stacks of articles to be loaded in is characterized, in particular, by the stack-of-articles pick-up of the bay-storage and retrieval unit, the shaft and the angle sheet iron of the higher-level supply bay, the buffer and the stack-of-articles stacker plate at the acceptance department having the same design in terms of length, width and optionally slope (longitudinal slope, transverse slope).

However, the size of the angle sheet iron of the higher-level supply bay may also be different. The smallest possible number of classes are preferably determined in order to make it possible to load articles of different sizes as close as possible, while the stack-of-articles pick-up of the bay-storage and retrieval unit always remains the same (corresponding to the largest grid).

An especially expedient variant of a bay-storage and retrieval unit according to the present invention provides for the article-handling unit being fixed via a pivot axis on a carriage, which is transversely displaceable on a transverse rail with a slope of the depth of the shaft and in the longitudinal direction of the shaft of the supply bay, especially with a slope of about 20°, wherein the transverse rail is rigidly fastened to a vertically displaceable lifting carriage of the bay-storage and retrieval unit.

The transverse rail may also be designed as a telescope, such that it can be displaced in a stationary telescopic unit.

The special advantage of this variant is that a small number of axes are sufficient for positioning the article-handling unit (axis in parallel to the shaft including two electric cylinders for linkage). Likewise, only two pushers (longitudinal pusher and transverse pusher) are needed.

Another embodiment of the bay-storage and retrieval unit, which is no less expedient, is characterized in that the article-handling unit is a two-part unit and has a separate, vertically adjustable stack-of-articles pick-up unit with a plurality of angle sheet irons of the type, position and size of the stack-of-articles pick-up and of the supply bay, which has at least one adjustable second longitudinal stack-of-articles pusher of its own, wherein a plurality of stacks of articles can be delivered as well as loaded and unloaded by the stack-of-articles pick-up unit from the buffer or from the stack-of-articles pick-up to the higher-level supply bay, and it has a separate, vertically adjustable article bay loading unit, which is in turn a two-part unit and has a vertically adjustable single stack-of-articles pick-up with the longitudinal stack-of-articles pusher and another transverse stack-of-articles pusher, on the one hand, and, on the other hand, a gripping unit movable in space with the bottom-side stack-of-articles pick-up, with the longitudinal stack-of-articles clamping plate and with the adjustable transverse stack-of-articles pusher, wherein a single selected stack of articles can be delivered by the article shaft loading unit from the supply bay (higher-level supply bay, buffer) or from the stack-of-articles stacker plate of the acceptance department into the high-speed automatic turning unit, and it can be loaded into a selected, essentially vertical shaft of the article bay there.

To load the stack of articles into the high-speed automatic turning unit, the stack of articles can then be expediently removed by the single stack-of-articles pick-up from the supply bay in the longitudinal direction of the stack by displacement with the longitudinal stack-of-articles pusher and can be delivered to the high-speed automatic turning unit and after transfer and transverse displacement of the stack of articles from the single stack-of-articles pick-up by the additional transverse stack-of-articles pusher to the bottom-side stack-of-articles pick-up of the aligned gripping unit (or by direct takeover by the gripping unit) and after clamping of the entire stack of articles in the transverse direction of the stack by the longitudinal clamping plate with the spring-tensioned fingers, it can be positioned and loaded at the selected shaft of the high-speed automatic turning unit by moving the gripping unit.

It shall be mentioned concerning the single stack-of-articles pick-up from the supply bay that, just as in the case of the stack-of-articles pick-up, a plurality of single stacks can be buffered at the bay-storage and retrieval unit, as a result of which it is possible to reduce the cycle time.

The gripping unit is fastened preferably via an axis of rotation to a vertically adjustable lifting carriage, which is in turn vertically displaceable on a vertical bar of the bay-storage and retrieval unit, which bar is articulated on the bottom side around two axes that are at right angles to one another.

The vertical bar expediently has a shorter length than the vertical bar, on which the single stack-of-articles pick-up and the stack-of-articles pick-up unit are vertically displaceable. The reason for this is that the height of a higher-level supply bay may be approx. 5.5 m, while the height of the high-speed automatic turning unit is usually approx. 2.5 m.

The axis with a length of 2.5 m may also be part of the principal axis and be connected to same in the form of a tandem axis.

The special advantage of the second embodiment variant is that the high-speed automatic turning unit filling unit has a sufficiently long (approx. 2.5 m) linear axis in parallel to the shaft, by which the displacement of the gripping unit along the shaft is facilitated. The vertical axis or bar proper of the bay-storage and retrieval unit carries only the pick-up unit (a plurality of stacks of articles on one side, a single stack of articles on the other side), which is likewise suitable for high supply bays (in the range of approx. 5.5 m).

Buffering of a plurality of stacks of articles is also conceivable on the other side. The stack of article pick-up unit may also be rotatable around a vertical axis by 180° to service double-sided bays.

In the second embodiment variant, it may be advantageous to use two separate devices for loading in and loading goods, because the operations may have different priorities and it may thus be possible to make do with fewer devices.

It is advantageous in each of the above-mentioned two basic embodiment variants for the direct loading into a (vertical) shaft of a high-speed automatic turning unit to be performed by clamping the stack of articles by the longitudinal clamping plate with simultaneous pushing out by the transverse stack-of-articles pusher of the stack of articles-handling unit of the bay-storage and retrieval unit. The stack of articles to be loaded (which is positioned nearly or exactly in the vertical position) is then held clamped until it is lowered in the article bay onto a support (i.e., on an article already loaded or on the bottom of the shaft).

The clamping force is preferably reduced in a product-specific manner during the pushing out. An additional bottom plate, which forms one unit with the clamping plate and guides the articles during loading until they cannot bend off, may be used especially in the case of short articles.

Thus, the present invention makes it possible to completely abandon separate stack-of-articles magazines (contrary to the state of the art mentioned in the introduction). Thus, such magazines do not need to be manufactured, nor do they need to be adapted to a special stack of articles, nor do they need to be conveyed within the system of the commissioning unit, and especially returned as empties from the high-speed automatic turning unit to the acceptance department, which is normally located at a great distance. The commissioning unit makes possible a favorable workplace design at the acceptance department. As the collective cardboard boxes with the articles (e.g., the amount of articles to be commissioned daily) are delivered there by a truck, the cardboard boxes can be rapidly and effectively unpacked there rapidly and simultaneously by a plurality of persons and the stacks of articles can be put together, e.g., in a morning shift. Nevertheless, the bay-storage and retrieval unit or bay-storage and retrieval units perform (normally over the entire workday) the distribution and the loading of the articles stack by stack at the necessary point in the high-speed automatic turning unit or at an optimized point within the system of the unit, utilizing supply bays in the form of a higher-level supply bay or supply bays and/or one or more buffer, which can be complemented or rearranged almost at will for an expansion or modification of the commissioning unit.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 7 is a schematic vertical view similar to FIG. 5 of an unpacking station with a buffer and a bay-storage and retrieval unit located between them;

FIG. 8 is a schematic top view of the unpacking station according to FIG. 7;

DESCRIPTION OF THE PREFERRED EMBODIMENT

Figure 1:
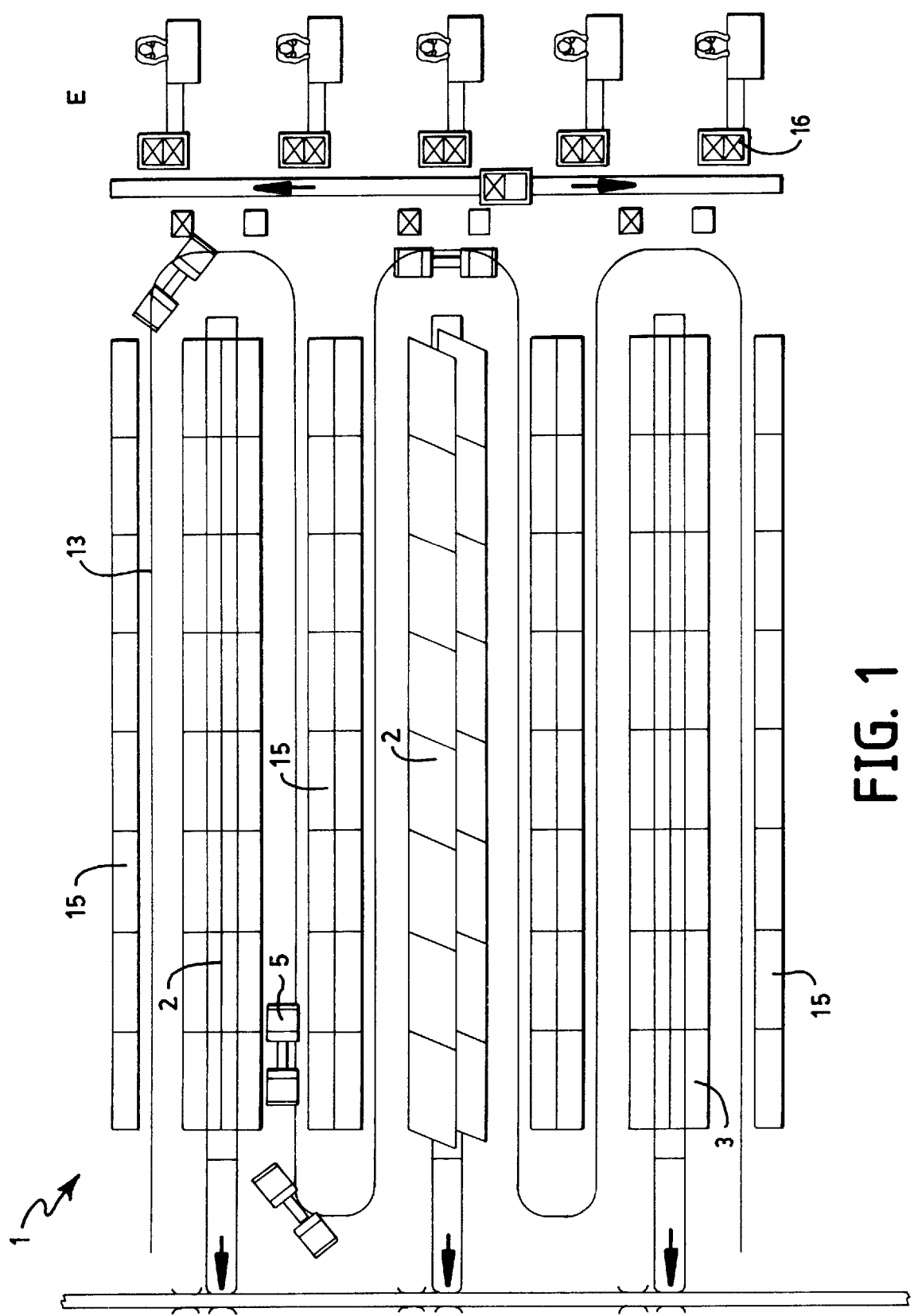
FIG. 1 is a schematic top view of a commissioning unit with high-speed automatic turning units, rail-borne bay-storage and retrieval units, higher-level supply bays, buffers and unpacking station.

Referring to the drawings in particular, FIG. 1 schematically shows the top view of a commissioning unit 1 with three high-speed automatic turning units 2, four higher-level supply bays 15 and five workplaces at the acceptance department E with stack-of-articles stacker plates and buffers 16, wherein four bay-storage and retrieval units 5 can be moved between the individual areas by means of a guide or rail system 13.

Figure 4:
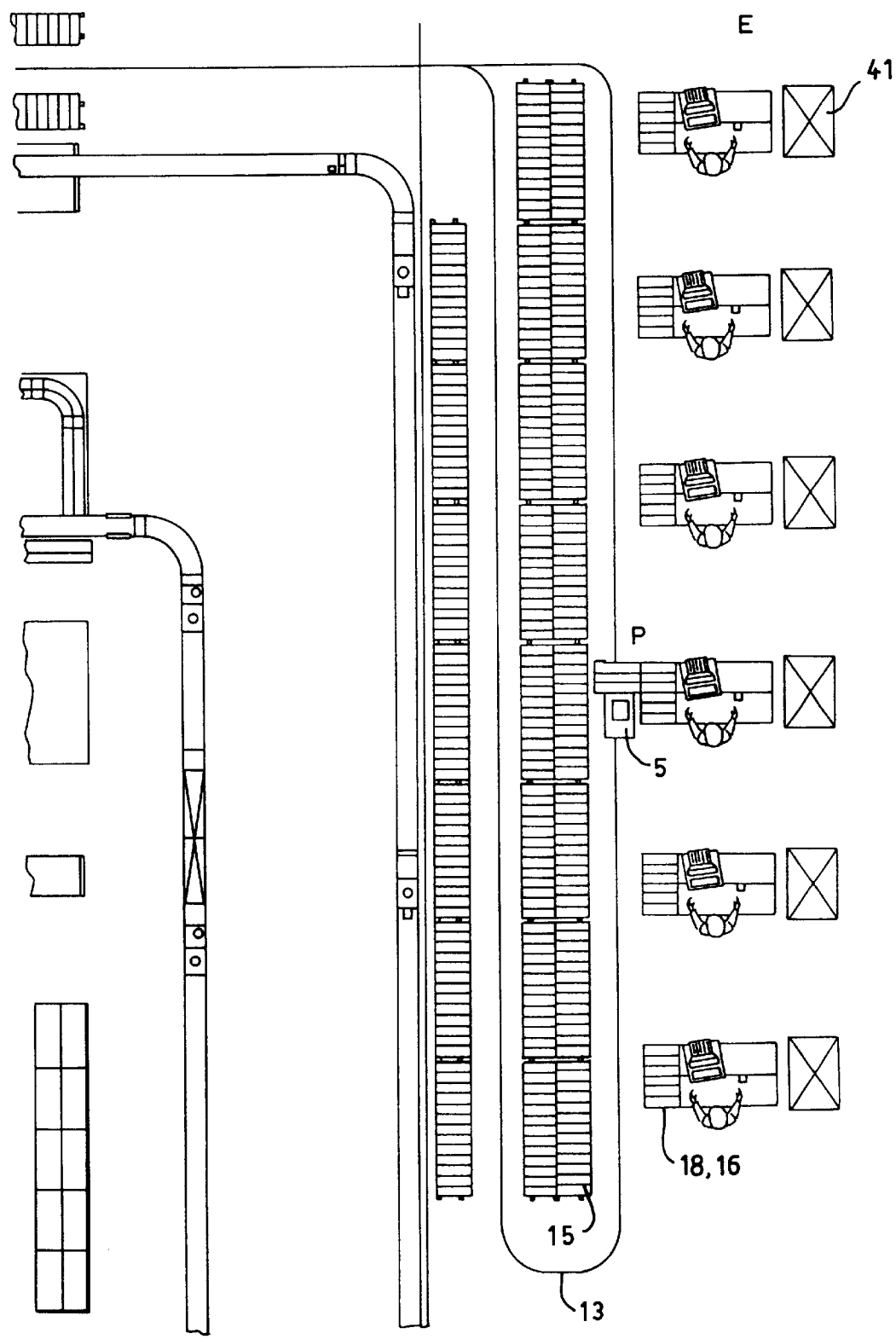
FIG. 4 is a schematic top view similar to FIG. 1 of a commissioning unit in the area of the unpacking station.

Another variant of the system with respect to the acceptance department E is shown in FIG. 4.

Figure 2:
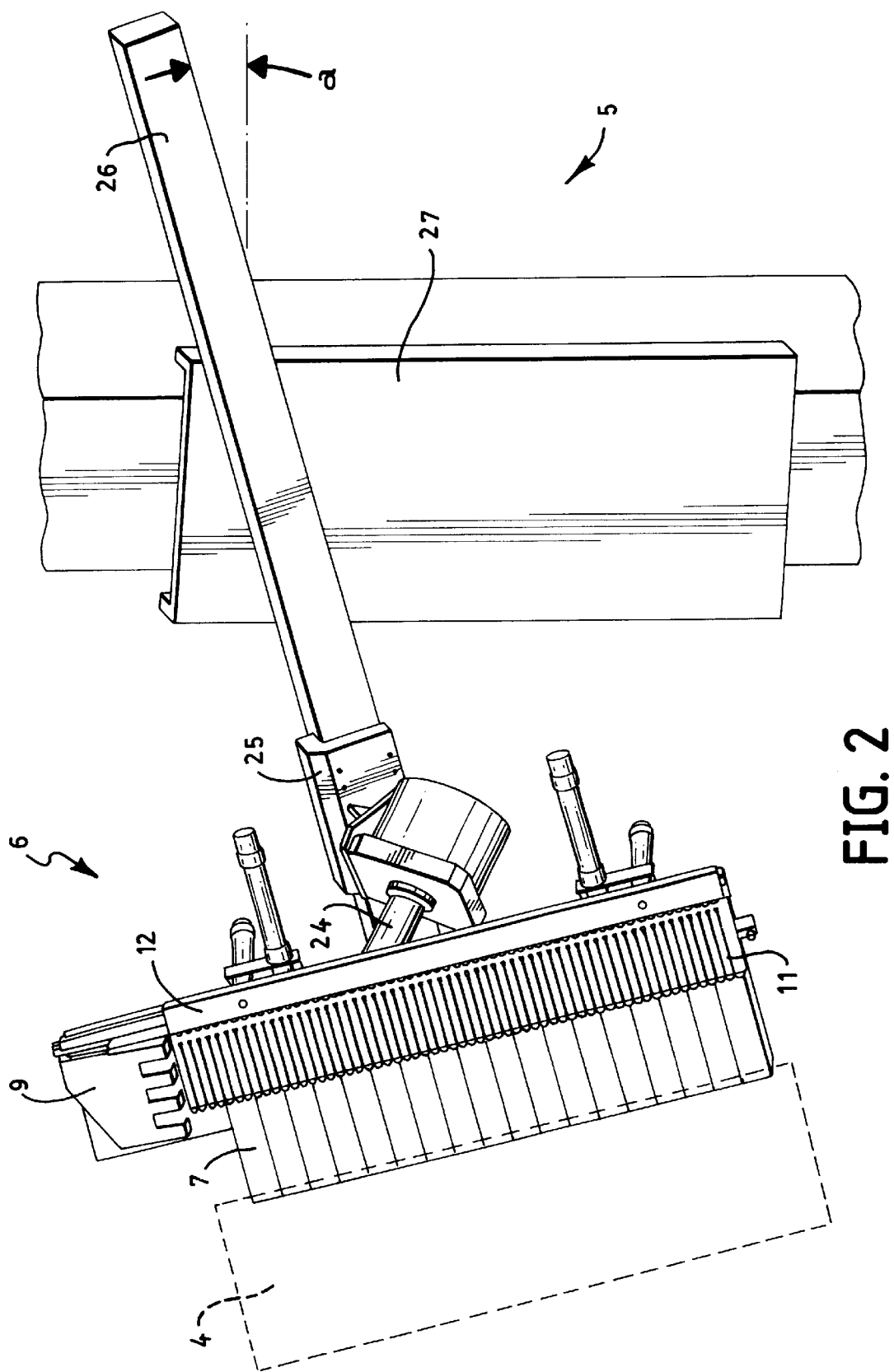
FIG. 2 is a schematic perspective view of an article-handling unit of a bay-storage and retrieval unit of the high-speed automatic turning unit according to a first embodiment variant.

Each high-speed automatic turning unit 2 has a plurality of article bays 3 with essentially vertical, preferably slightly sloped article shafts 4 according to FIG. 2, which are arranged next to one another, are accessible from the front and in which articles to be commissioned can be stored, namely, by means of the bay-storage and retrieval unit 5, which can be positioned at each article shaft 4 of the high-speed automatic turning unit.

Figure 3:
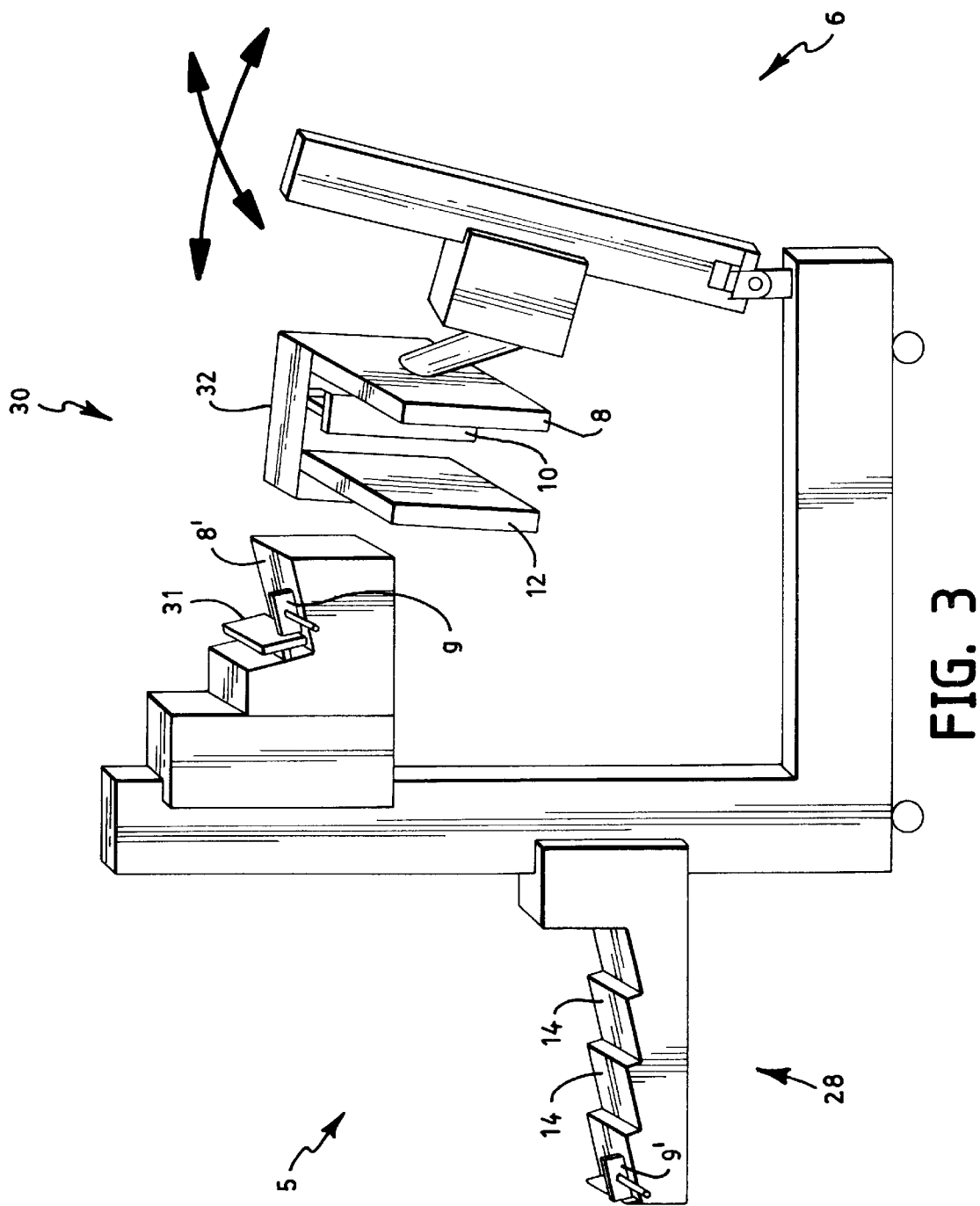
FIG. 3 is a schematic perspective view of a bay-storage and retrieval unit of the high-speed automatic turning unit with an article-handling unit according to a second embodiment variant.

Each bay-storage and retrieval unit 5, e.g., according to the two basic variants according to FIGS. 2 and 3, has an article-handling unit 6, which can store articles of the same brand or dimension stack by stack without a magazine, wherein a stack of articles 7 to be stored is handled simultaneously by the bay-storage and retrieval unit without a separate stack-of-articles magazine or container and the article-handling unit 6 has a bottom-side stack-of-articles pick-up 8, an adjustable longitudinal stack-of-articles pusher 9, an adjustable transverse stack-of-articles pusher 10, and a row of adjustable longitudinal stack-of-articles clamping plate 12 having spring-tensioned fingers 11, which said plate is located in parallel to and opposite the stack-of-articles pick-up 8 and pushes in the clamped state a picked-up stack of articles 7 by means of the spring-tensioned fingers against the stack-of-articles pick-up in the transverse direction of the stack.

The "bottom-side" stack-of-articles pick-up 7, which is normally located at the bottom in the article-handling unit 6, may also assume a non-bottom-side, e.g., lateral vertical position, especially when a clamped stack of articles is positioned at a (vertical) shaft of the high-speed automatic turning unit.

Figure 5:
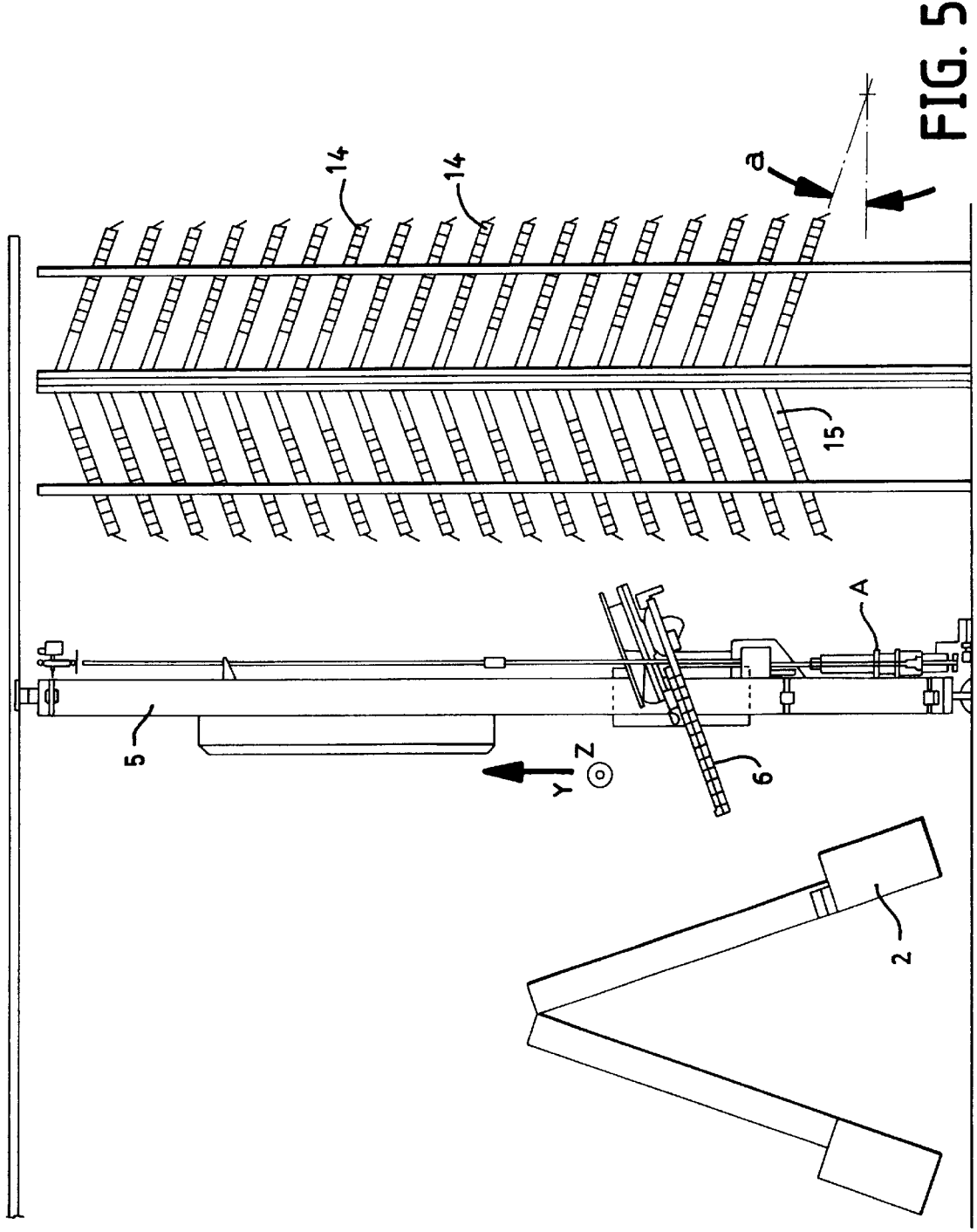
FIG. 5 is a schematic front view of a high-speed automatic turning unit, a higher-level supply bay and a bay-storage and retrieval unit in the bay aisle located between them.
Figure 6:
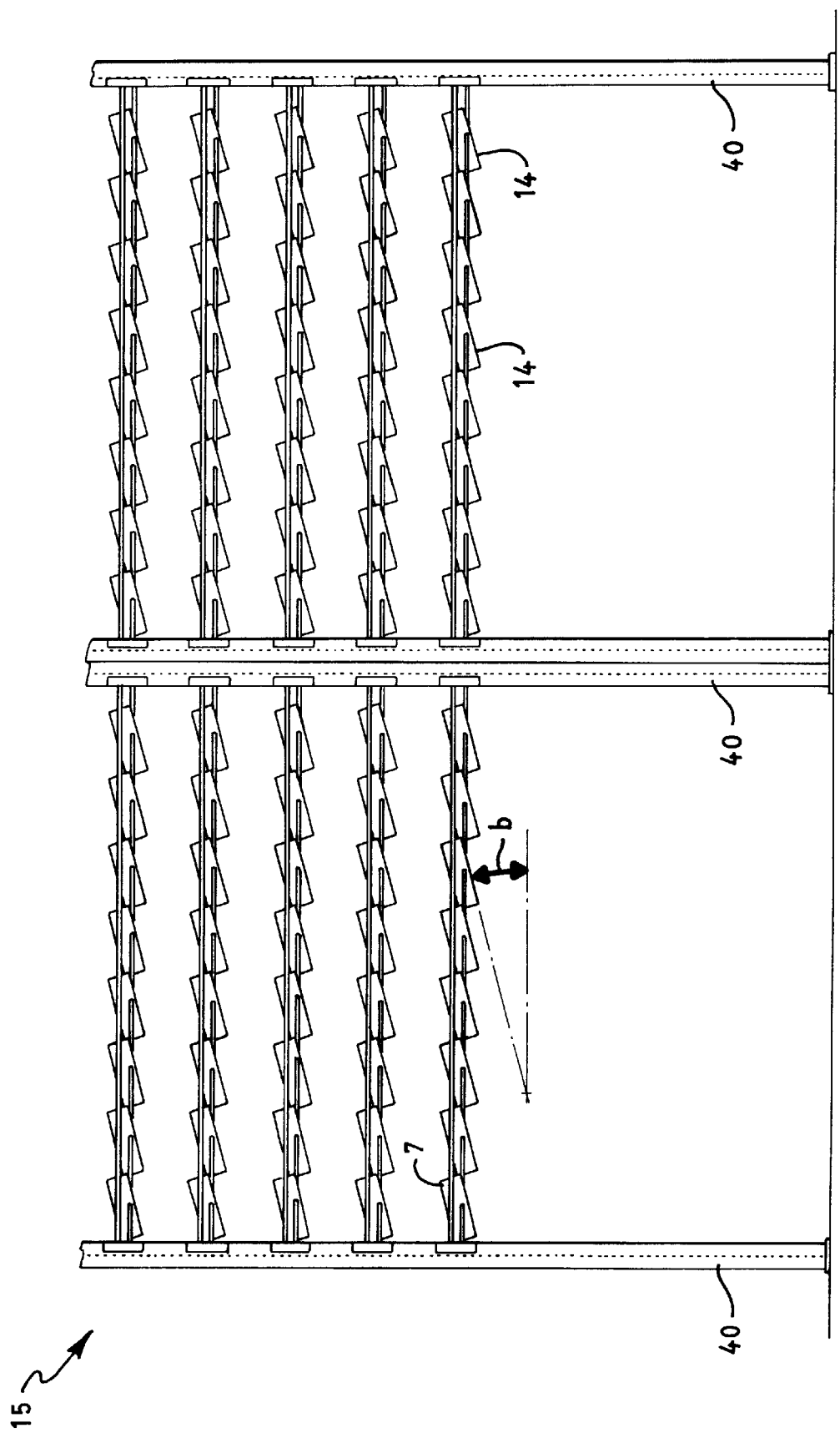
FIG. 6 is a schematic side view of part of the higher-level supply bay according to FIG. 5 as viewed from the bay aisle.
Figure 9:
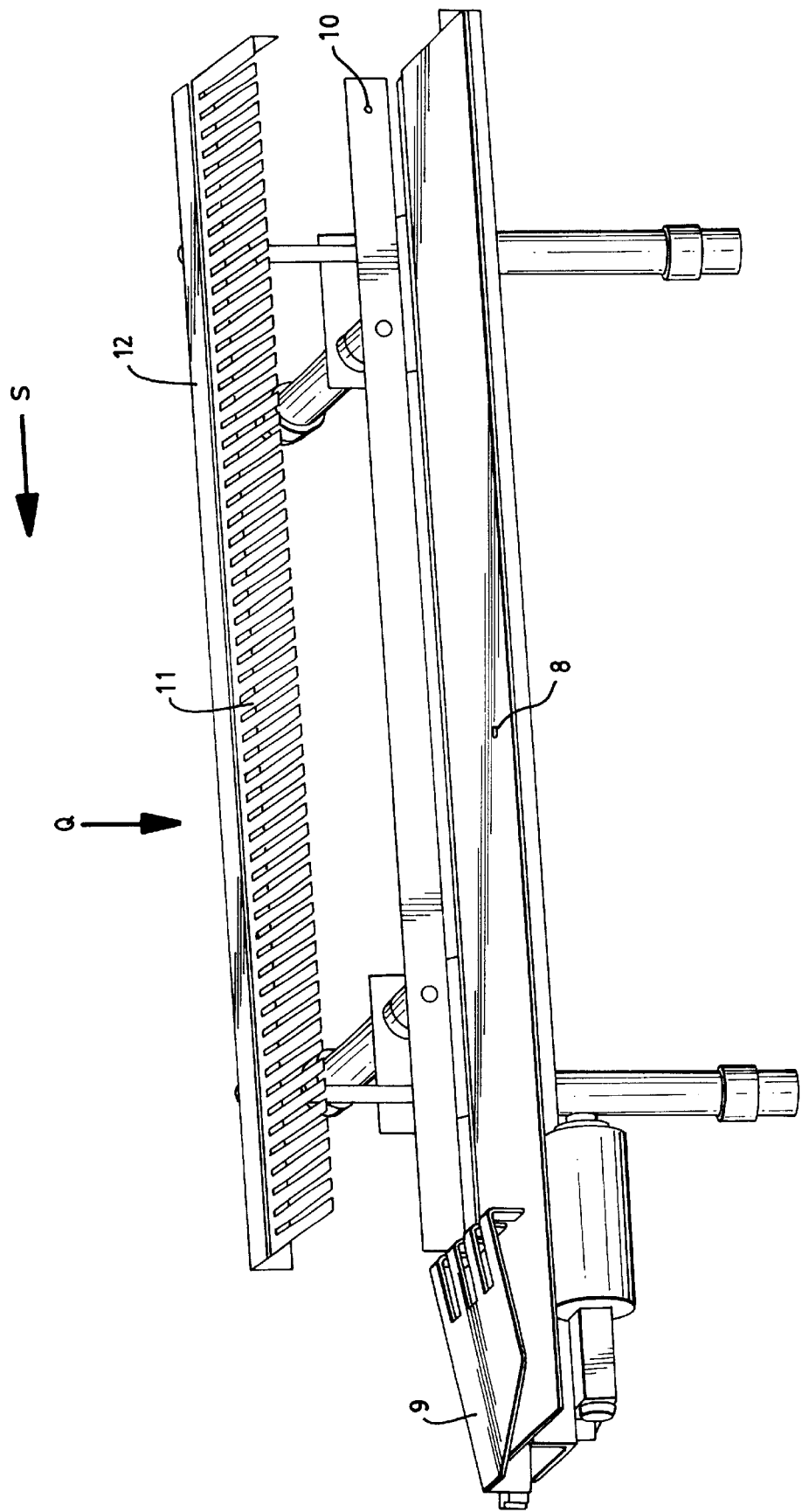
FIG. 9 is a perspective view of the article-handling unit according to FIG. 2 in the area of the stack-of-articles pick-up.

Each supply bay, both the higher-level supply bay 15 and the buffer 16, has the same basic design in the form of a stand 40 with four supports and a plurality of bay levels in the form of doubly sloped angle sheet irons 14 arranged next to one another, as can be seen especially in FIGS. 5, 6 and 7.

The stack-of-articles stacker plate 18 at the acceptance department E also has a corresponding design, but it is located in a single bay level only, and two stacker plates 18 may be arranged back to back, as is apparent especially from FIGS. 7 and 8.

Figure 12:
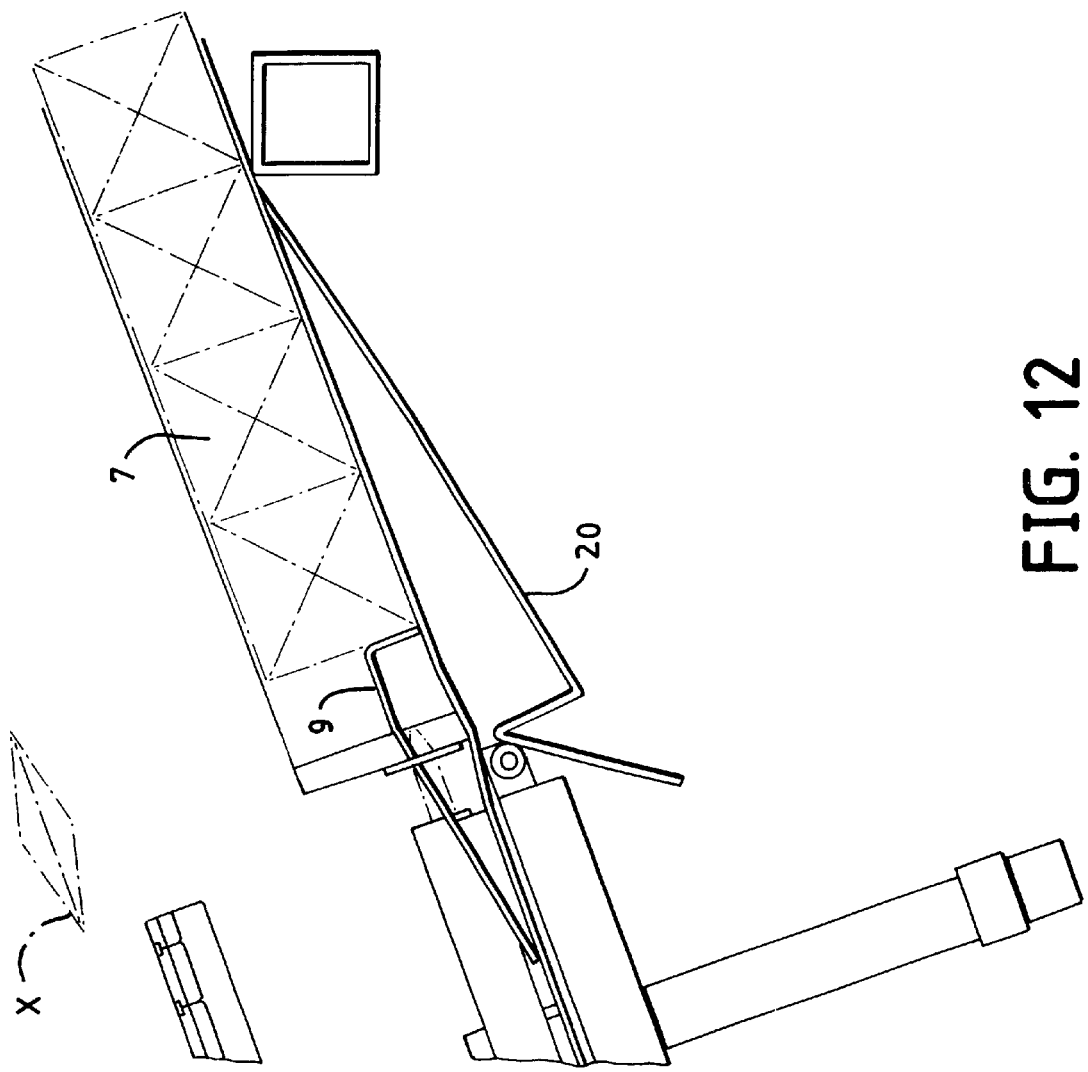
FIG. 12 is a schematic vertical partial sectional view of the coupling operation of the article-handling unit according to FIG. 9 at a higher-level supply bay in another position during the operation.

A doubly sloped angle sheet iron 14 forms a groove, which has a rectangular cross section and is oblique in the longitudinal direction, wherein the angle root is located at the deepest point in each longitudinal cross section of the groove and both surfaces of the legs of the angle are stop faces for a stack of articles 7 picked up, and, furthermore, a detachable, preferably depressible article stop 20 is provided at the deepest end of the groove, as is shown especially in FIG. 12.

The slope a of the groove in the longitudinal direction is 19°. The slope b of the base of the groove in the transverse direction is 15°.

Figure 10:
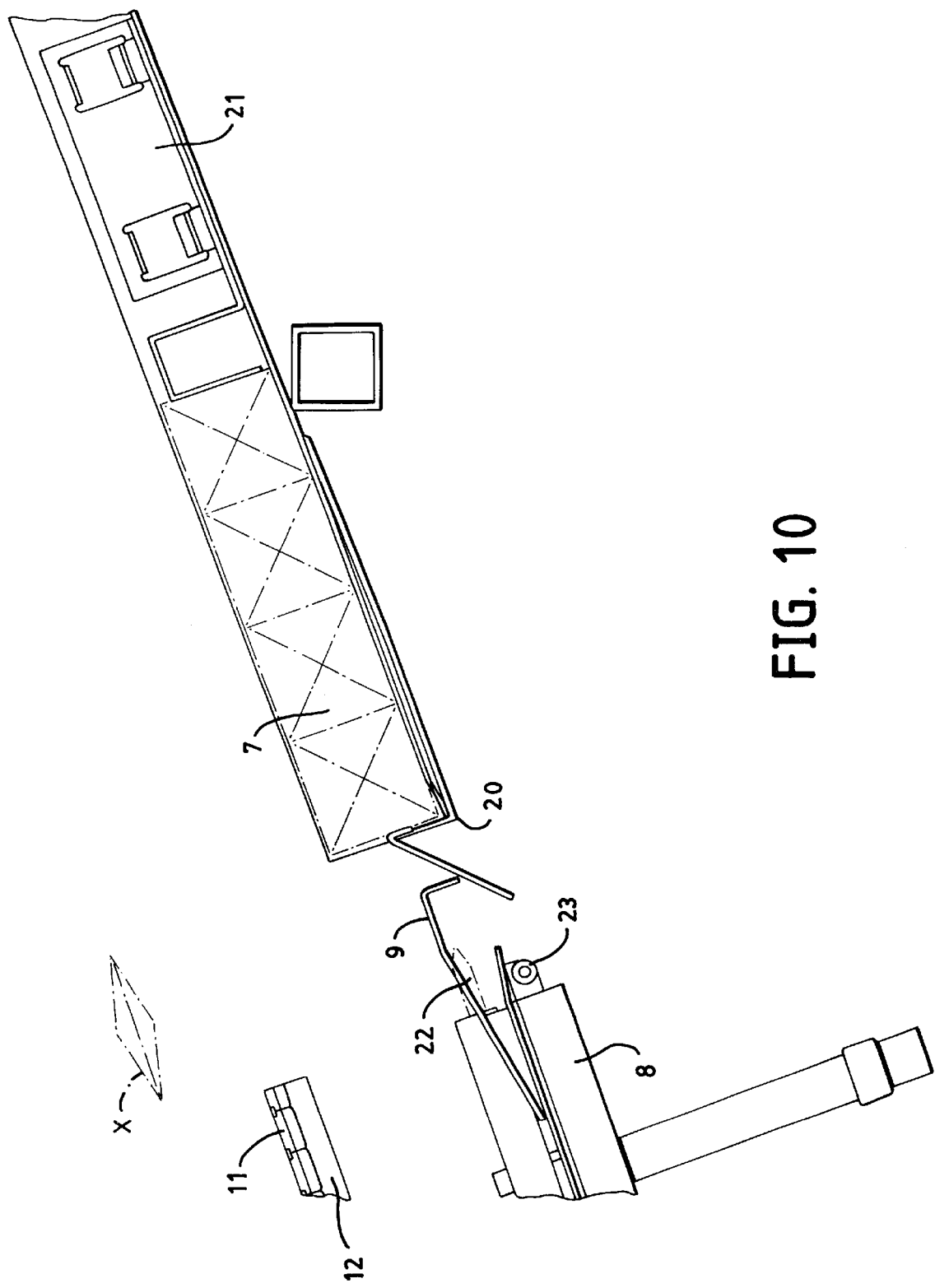
FIG. 10 is a schematic vertical partial sectional view of the coupling operation of the article-handling unit according to FIG. 9 at a higher-level supply bay in a position during the operation.

A stack of articles 7 picked up in the groove may have a longitudinal fixing aid, especially a rolling cart 21 according to FIG. 10, which pushes the stack of articles against the article stop 20.

Like a doubly sloped angle sheet iron, the bottom-side stack-of-articles pick-up 8 of the article-handling unit of the bay-storage and retrieval unit is also sloped, namely, from one bay to the next in the starting position during the transportation of a stack of articles and in the direction of the stack from one bay to the next during the displacement of a stack of articles, but not during positioning and loading at a selected (vertical) shaft 4 of a high-speed automatic turning unit, e.g., according to FIG. 2. The stack of articles is held clamped in the latter position, namely, by the longitudinal clamping plate 12, whose spring-tensioned fingers 11 push the stack of articles picked up in the pick-up 8 against the stack-of-articles pick-up 8.

Each bay-storage and retrieval unit 5 is consequently displaceable by means of the guide or rail system 13 from and to at least one supply bay and can be positioned on the front side at a selected lateral end A of a shaft of the supply bay, namely, at an angle sheet iron 14.

With special reference to FIGS. 10, 11, 12 and 13, a single stack of articles 7 to be handled reaches at each selected angle sheet iron an aligned article pick-up 8 of the article-handling unit due to displacement in the direction S of the stack and vice versa.

Instead of a single stack of articles, it is also possible to accommodate two article columns or stacks, located in parallel to one another, in one bay shaft, especially in the case of small articles.

The bay-storage and retrieval unit according to FIG. 2 has an article-handling unit 6, which is fastened to a carriage 25 via a pivot axis 24, wherein the transverse rail 26 is rigidly or telescopically fastened to a vertically displaceable lifting carriage 27 of the bay-storage and retrieval unit 5.

During operation, the bay-storage and retrieval unit moves, e.g., to the shaft in the higher-level supply bay containing the stack of articles to be removed. The positioning in the X and Y directions is performed via a corresponding optical or inductive sensory mechanism. Preliminary rough positioning is performed by a learning travel of the bay-storage and retrieval unit and its repeatability, after which fine positioning is performed by means of a cone with a corresponding hole on the angle sheet iron of the bay side.

The feed travel of the loading unit begins as the second movement via the feed axis or transverse axis 26, which extends in the direction of the imaginary extension of the higher-level supply bay.

Figure 11:
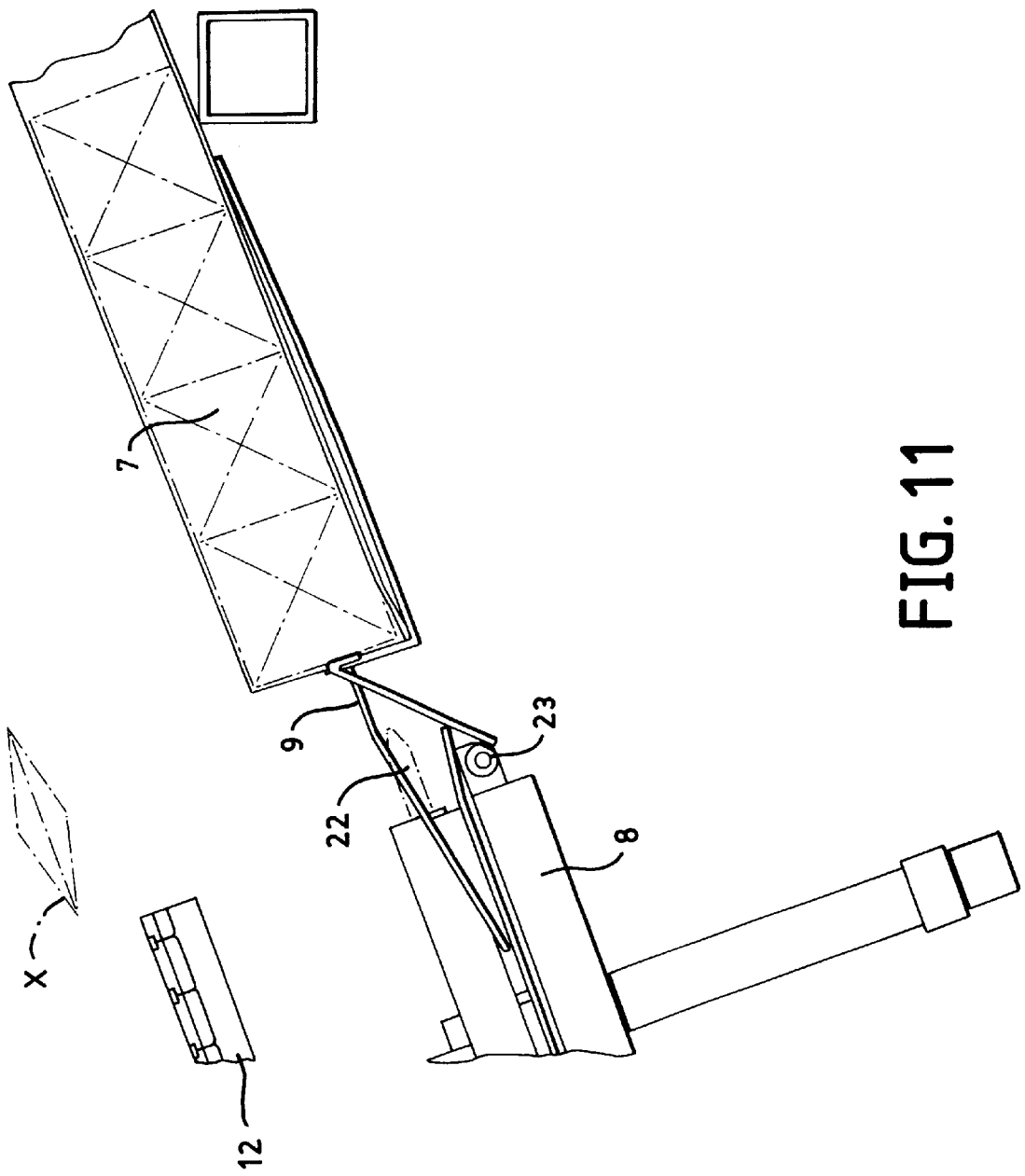
FIG. 11 is a schematic vertical partial sectional view of the coupling operation of the article-handling unit according to FIG. 9 at a higher-level supply bay in another position during the operation.

According to FIGS. 10, 11 and 12, this movement is divided into a plurality of functions.

The stop 20 of the higher-level supply bay is first pushed down by the linear movement over the small roller 23 on the loading unit. The stack of articles 7 to be removed is supported at the same time in the higher-level supply bay by the pusher 9 of the loading unit. An accurate positioning of the loading unit at the higher-level supply bay is also performed during this movement via a conical hole centering 22 in order to obtain the most homogeneous sliding surface possible between the higher-level supply bay plate and the sliding plate of the loading unit.

The cone 22 also extends either telescopically or via an axis of its own at a higher velocity than does the transverse pusher, so that there will be no collision between components during the loading of the shaft of the high-speed automatic turning unit.

Figure 13:
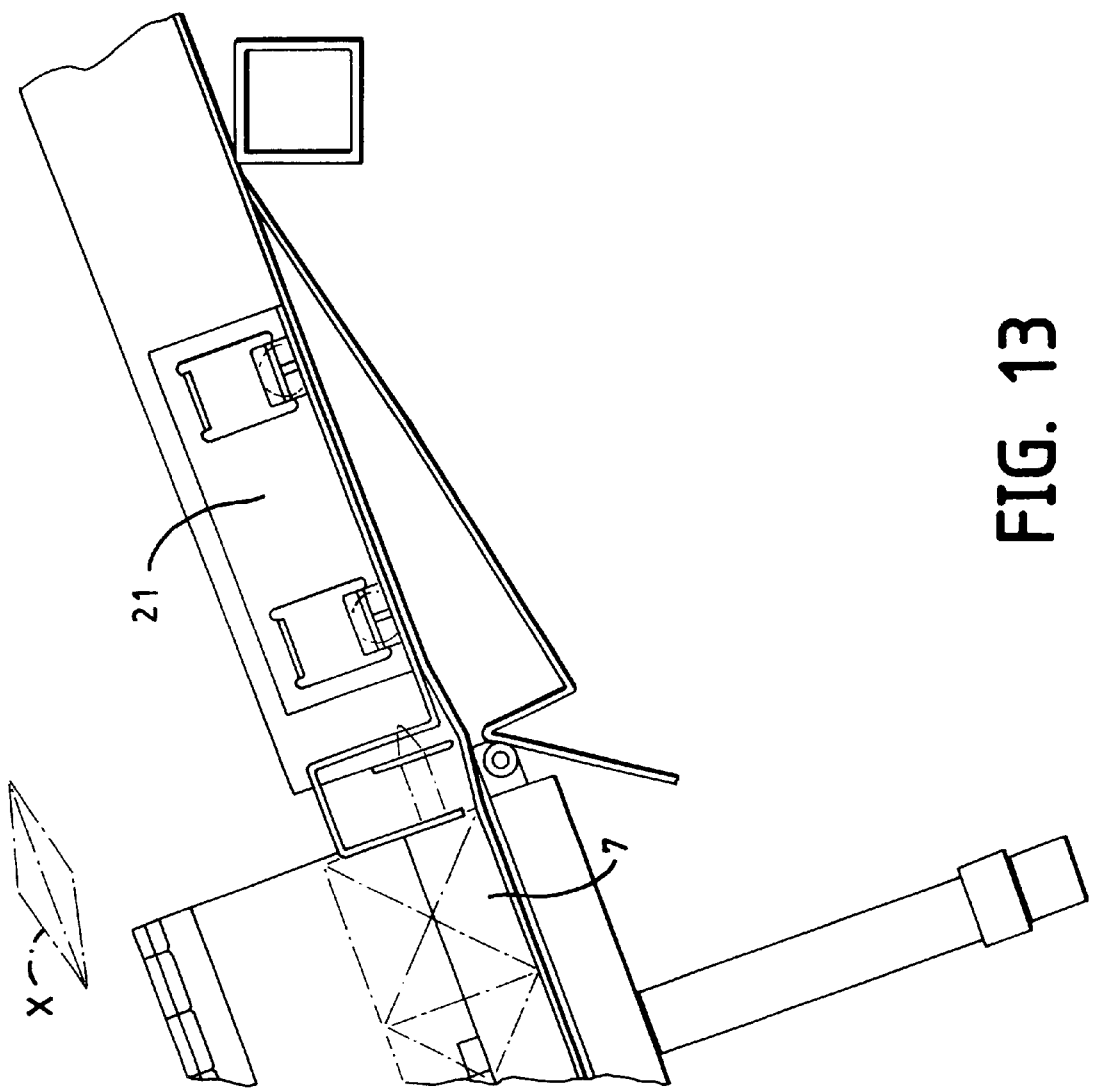
FIG. 13 is a schematic vertical partial sectional view of the coupling operation of the article-handling unit according to FIG. 9 at a higher-level supply bay in another position during the operation.

According to FIG. 13, the removal of the stack of articles 7 is performed after the conclusion of the coupling operation. Due to the displacement of the pusher 9, the stack of articles slides over onto the sliding plate of the loading unit. The support cart 21 now follows the movement continuously at the end of the stack of articles 7 in the higher-level supply bay in order to guarantee the integrity of the stack of articles.

Figure 14:
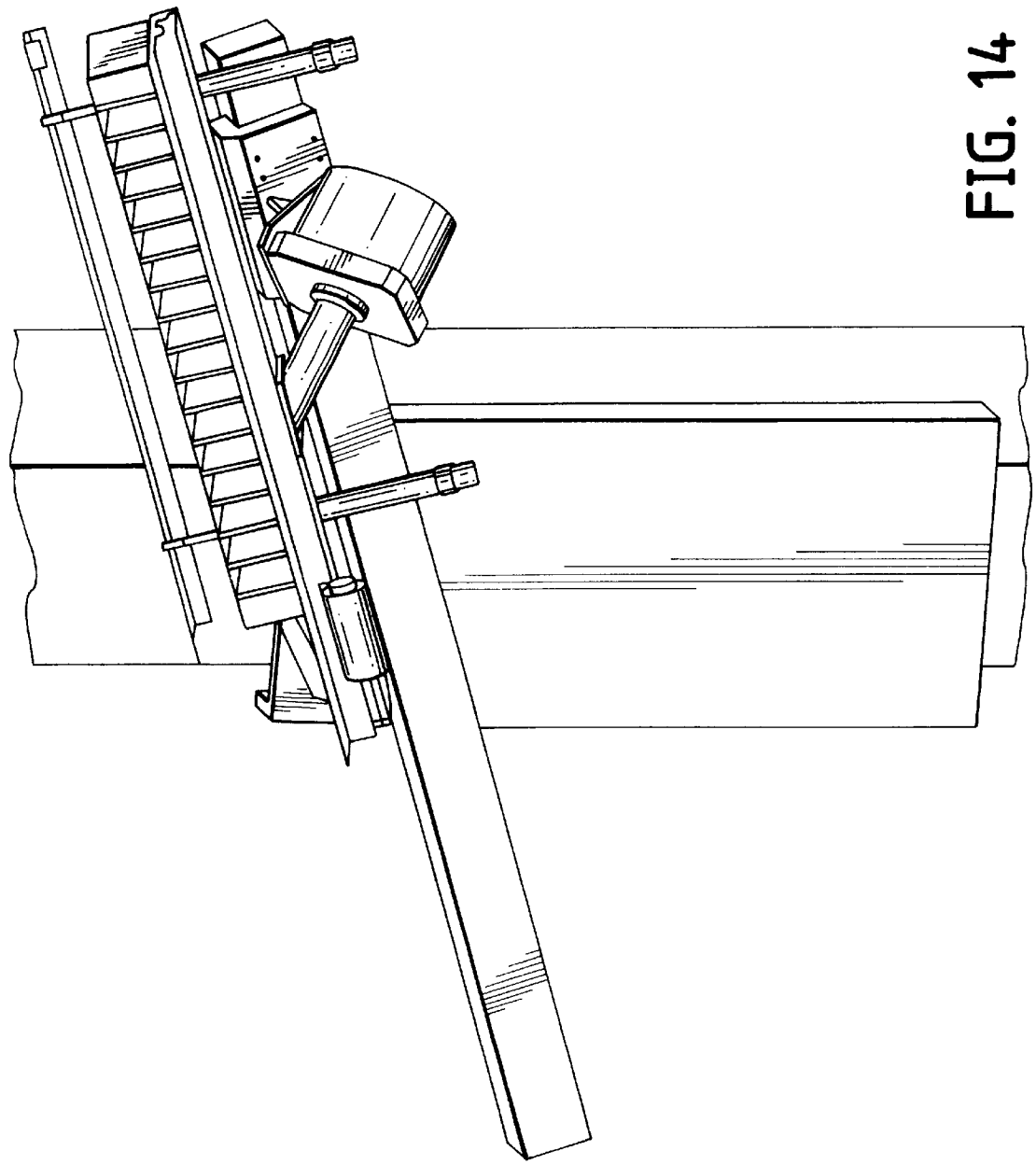
FIG. 14 is a perspective view of the article-handling unit according to FIG. 13 immediately after the pick-up of the stack of articles.

According to FIG. 14, this operation is considered to have concluded when the last article of the column or stack has been pushed over onto the loading unit. The support cart 21 continuously exerts its force on the stack up to this position in order to prevent the last article from tilting over or being left behind.

Figure 15:
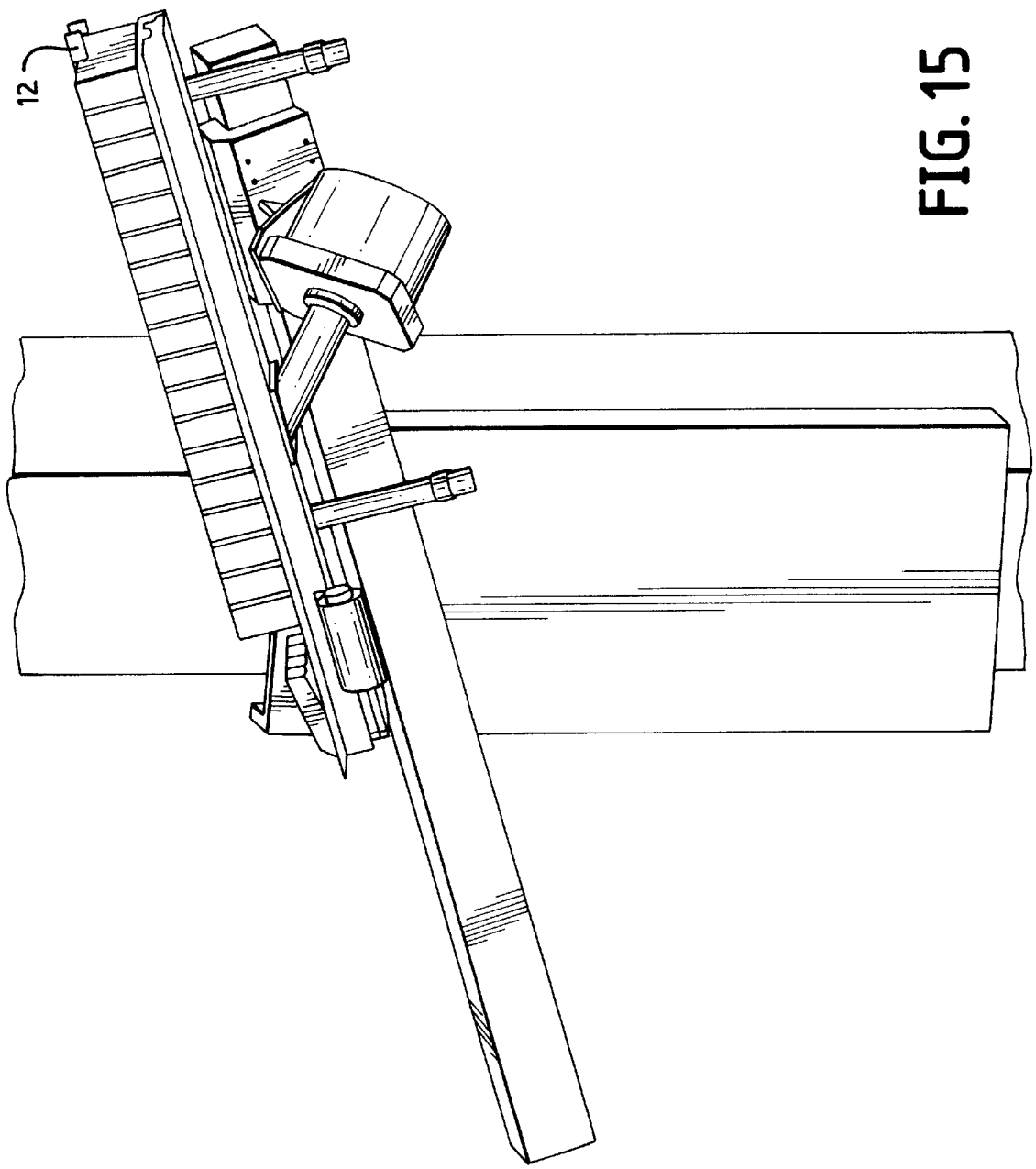
FIG. 15 is the article-handling unit according to FIG. 14 immediately after the clamping of the stack of articles by the transverse displacement of a longitudinal clamping plate.

According to FIG. 15, the stack of articles is fixed in its position by means of the clamping device in the form of the longitudinal clamping plate 12 once it is completely on the loading unit.

Contrary to the coupling situation, upward movement of the stop 20 takes place during the travel of the loading unit due to a sliding movement at the above-described small roller. The support cart continues to travel along in this area with the article column or the stack of articles and is held securely in the higher-level supply bay by the stop that has already swung up after a travel of about 20–30 mm. During the removal of a product column, the rake mounted on the support cart is supported correspondingly at the last product and is held, secured by the stop moving up (dipping of the rake through the stop plate).

Figure 16:
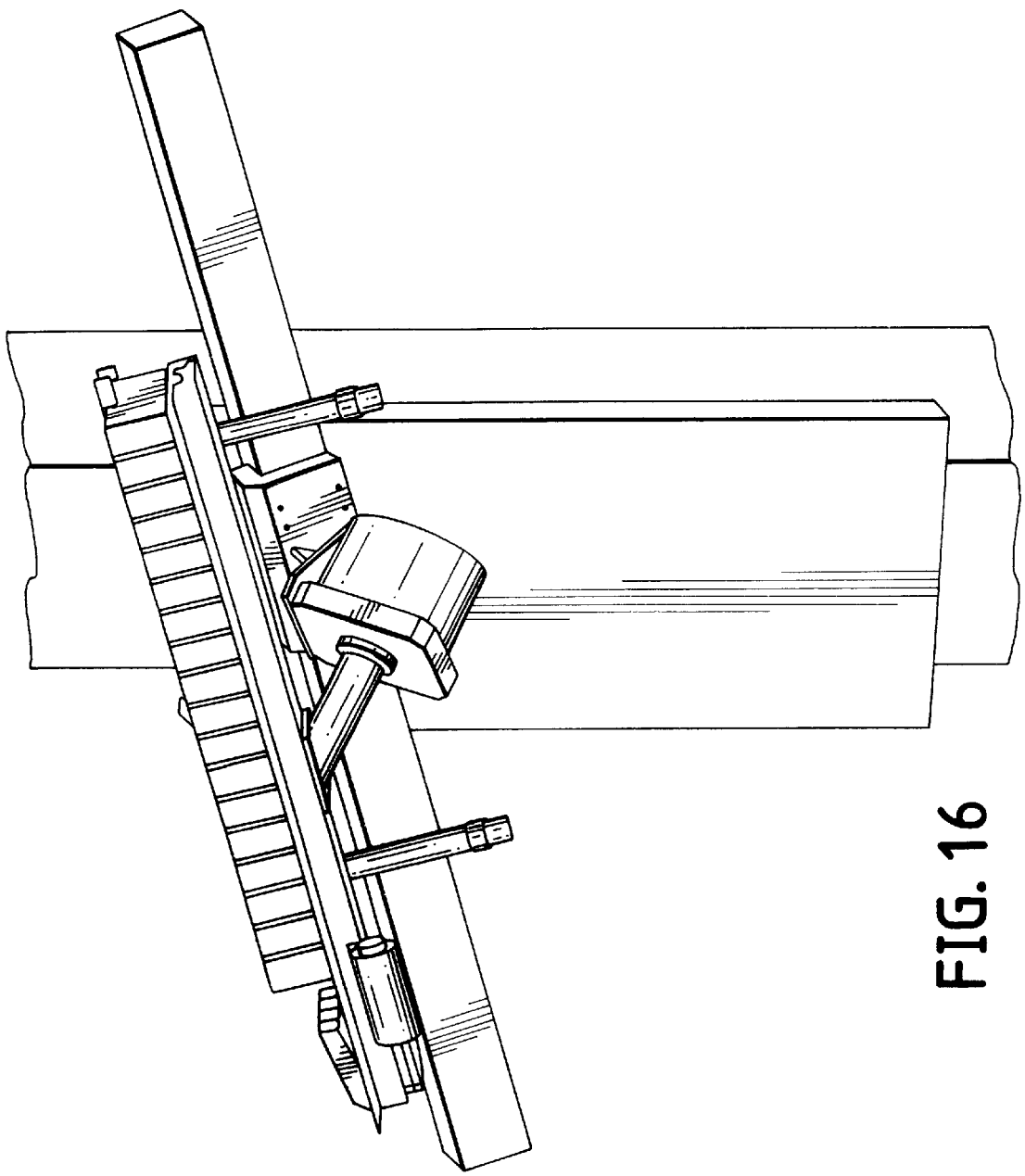
FIG. 16 is a view showing an intermediate position of the article-handling unit according to FIG. 14 for positioning at a slightly oblique vertical shaft of a high-speed automatic turning unit according to FIG. 2.
Figure 17:
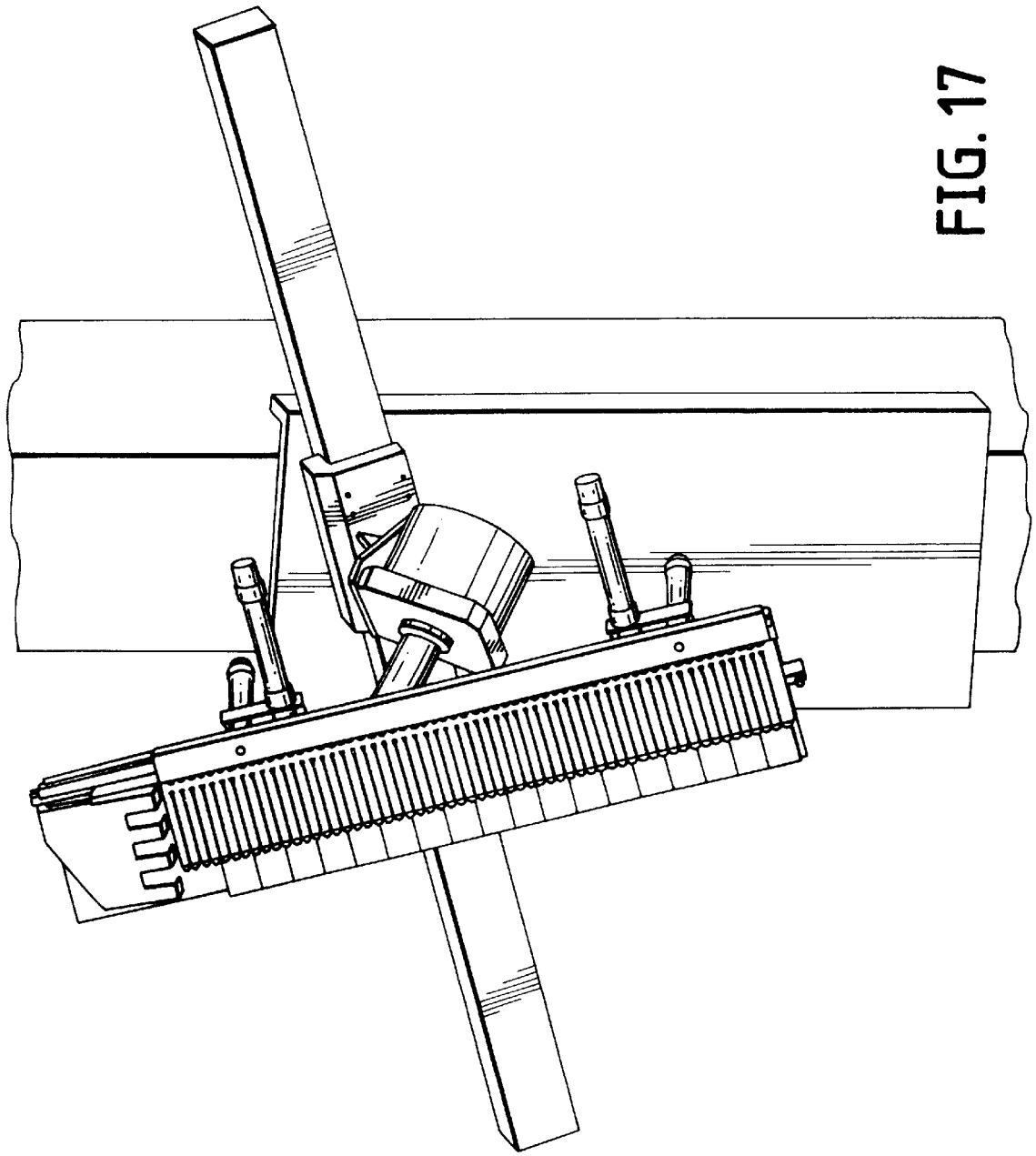
FIG. 17 is a view showing another intermediate position of the article-handling unit according to FIG. 14 for positioning at a slightly oblique vertical shaft of a high-speed automatic turning unit according to FIG. 2.

According to FIGS. 16 and 17, the loading unit is then displaced into the middle position by means of the feed axis or transverse rail 26 and the carriage 25. The pivoting with the pivot axis 24 into a position in which the stack of articles 7 stands in parallel to the shaft 4 of the high-speed automatic turning unit takes place here. By judiciously selecting a pivot axis 24, which is sloped in space, it is possible to rotate the stack of articles 7 from the doubly sloped angle sheet iron of the higher-level supply bay in parallel to the doubly sloped shaft 4 of the high-speed automatic turning unit with only one pivoting movement.

Figure 18:
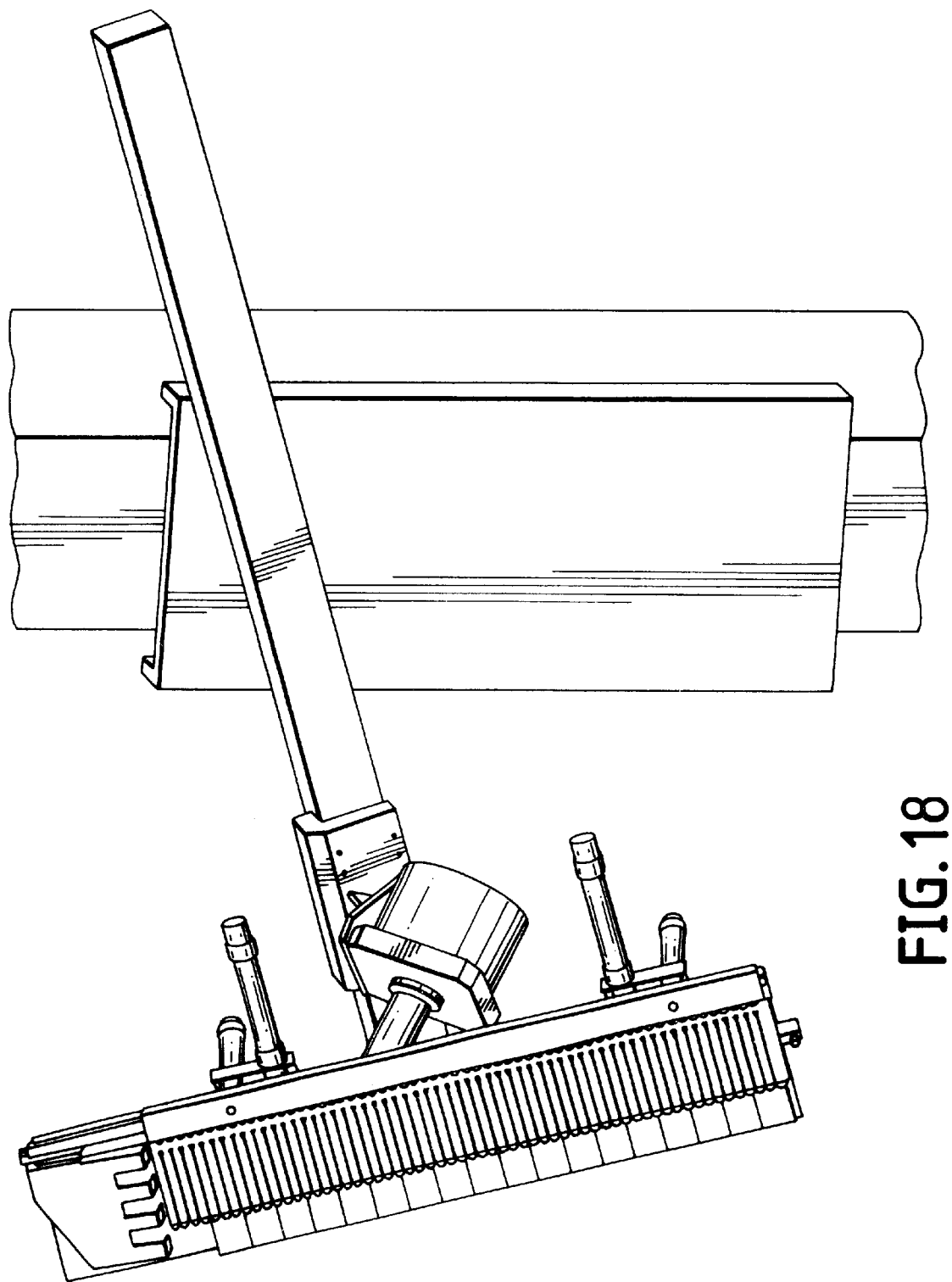
FIG. 18 is a view showing another intermediate position of the article-handling unit according to FIG. 14 for positioning at a slightly oblique vertical shaft of a high-speed automatic turning unit according to FIG. 2.

According to FIG. 18, the bay-storage and retrieval unit next travels to the shaft of the high-speed automatic turning unit that is to be filled. Accurate positioning in the X, Y and Z direction will again take place here. The loading unit is then fed by means of the feed axis or the transverse rail 26 to the shaft 4 of the high-speed automatic turning unit 2, finely positioned by means of an optical or inductive sensory mechanism and introduced into the shaft 4 of the high-speed automatic turning unit. The loading unit lowers itself in the direction of the shaft until the stack of articles 7 is deposited on the topmost article located in the shaft. This lowering takes place by a coordinated movement of the travel axis of the bay-storage and retrieval unit, the lifting table 27 and the transverse rail 26 and the carriage 25. An additional linear axis in parallel to the shafts of the high-speed automatic turning unit is also conceivable.

According to FIG. 2, the transverse pusher 12 pushes the stack of articles 7 though the clamping into the shaft 4 of the high-speed automatic turning unit. The clamping device is released, and the loading unit is pulled out of the shaft 4 by means of the transverse rail/carriage and is moved into the middle position.

With reference to FIG. 4, which shows a different arrangement of the higher-level supply bay 15 than does FIG. 1, a collective box from a pallet 41 may be unpacked at the acceptance department E by a person on a work bench and stacks of articles of a length of, e.g., approx. 600 mm can be put together and be arranged on a stacker plate 16, 18.

This "goods acceptance buffer" 16, 18 can be described as follows:

There are about five storage shafts each in two levels and, to make it possible to work ergonomically, one free storage shaft each is pushed into position P. After pushing off, a foot switch is actuated in order to automatically move the next free shaft of the goods acceptance buffer into the correct position. As an alternative, the shafts may also be conveyed on a conveyor belt, in which case one free shaft each is moved into position P. The articles of the same brand are conveyed manually or automatically into the shafts of the goods acceptance buffer.

To these goods acceptance places corresponds a higher-level supply bay 15, which is designed such that an amount of articles received that approximately corresponds to the amount needed in a day is buffered, and the length is selected to be such that a certain number of circulating bay-storage and retrieval units will pass by the goods acceptance places frequently enough to empty and rearrange the channels filled correspondingly. The removal from the goods acceptance buffer onto the bay-storage and retrieval unit 5 takes place in the same manner as from the higher-level supply bay.

However, other possible embodiments of a stacker plate 18 at the acceptance department E are conceivable as well.

Provisions may be made, in particular, according to FIGS. 7 and 8, to deposit the stacks of articles 7 unpacked from a collective box 17 on a double stacker plate 18, wherein the stack-of-articles stacker plate 18 is rotatable 180° around a vertical axis 19 in order to align the stacks of articles 7 to be removed in the direction of the bay-storage and retrieval unit 5 and also to fill the double stacker plate 8 on the other side.

The bay-storage and retrieval unit 5 according to FIG. 7 can be rotated (after a 180° rotation of the article-handling unit 6 around a vertical axis[)] and adjusted downward in the vertical direction in order to take over the stack of articles 7 by displacement. The longitudinal slope a and the transverse slope b of the stacker plate and of the pick-up 8 are equal. The two devices are exactly aligned with one another in the longitudinal direction, so that a displacement of the stack of articles can take place by utilizing the slope with the support of the rolling cart. The longitudinal pusher 9 is now used to release the article stop at A of the stacker plate, on the one hand, and, on the other hand, "to brake" the stack of articles during the return until the stack of articles has been completely taken up on the pick-up 8 of the article-handling unit of the bay-storage and retrieval unit. The pusher is then used as an article stop.

The article stop A may also be released by the feed motion of the loading unit. The longitudinal pusher itself now has a rake, which can dip through the article stop. This rake moves the product column to the back by about 20 mm during coupling in order to subsequently pick up the article column utilizing the force of gravity, controlled by the transverse pusher.

Figure 20:
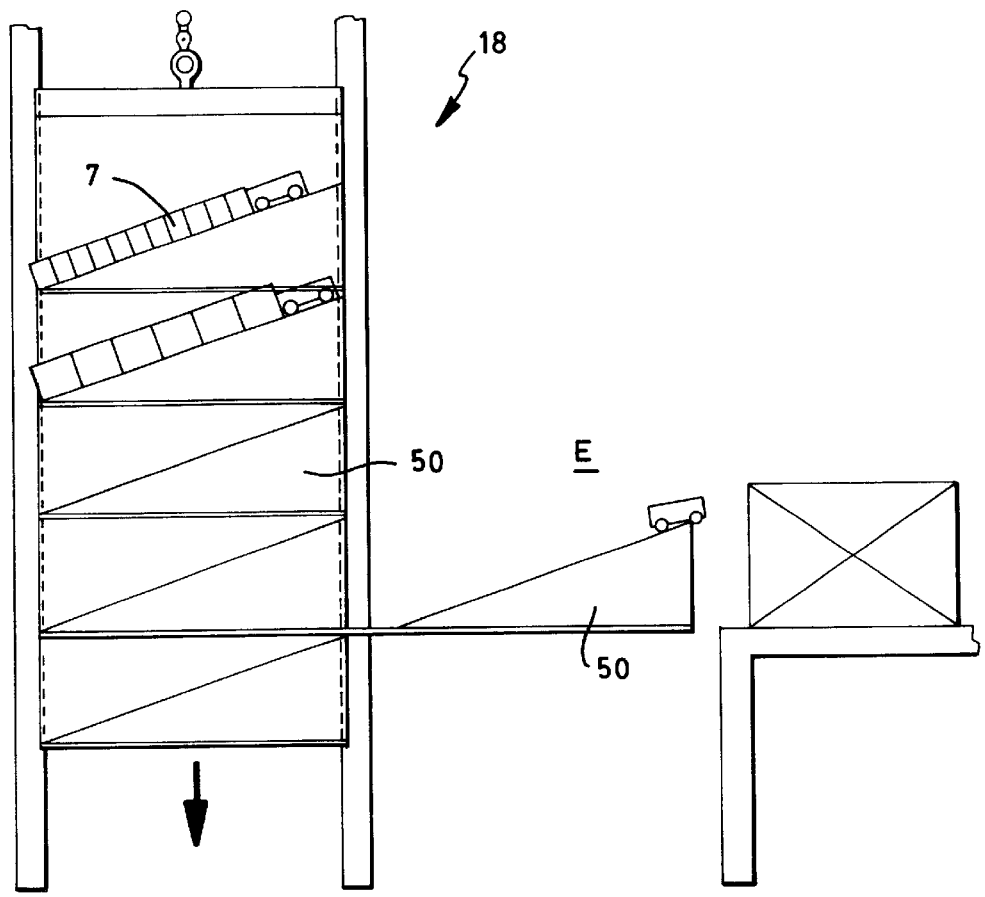
FIG. 20 is a schematic vertical sectional view similar to FIG. 7 of an unpacking station with buffer.
Figure 21:
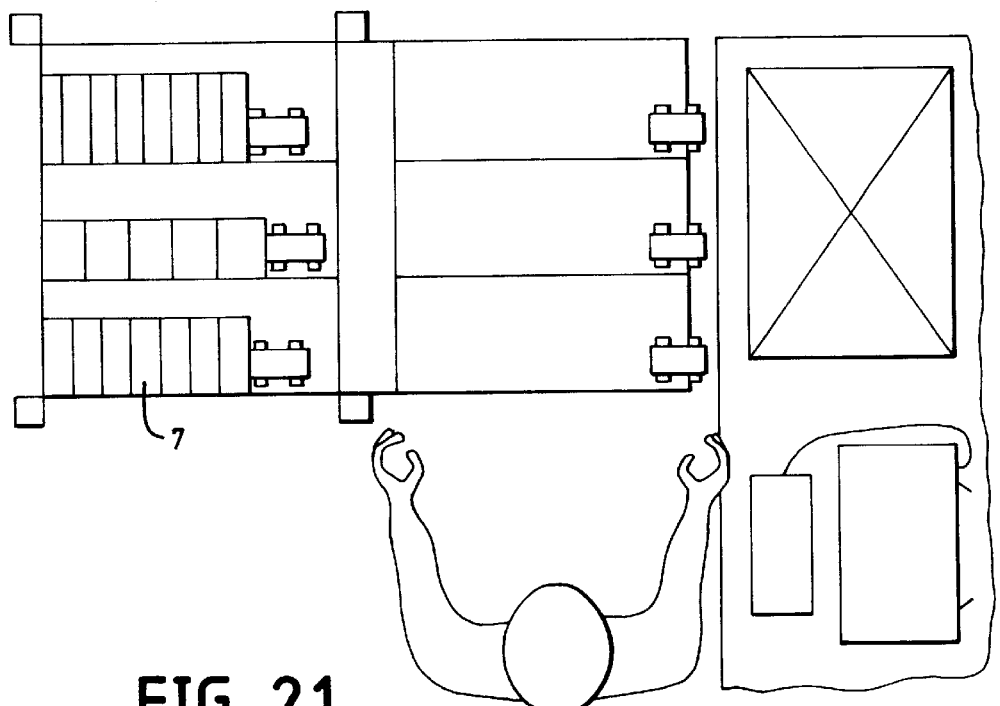
FIG. 21 is a schematic top view of the unpacking station according to FIG. 20.

Another unpacking station according to FIGS. 20 and 21 can be described as follows:

The stack-of-articles stacker plate 18 comprises a vertically displaceable bay with horizontally movable drawers 50, which can be pulled out manually into the area E of a human operator. The vertically displaceable bay now moves with a free plane to the level of the workplace. The empty drawer 50 is pulled manually to the right according to the drawing, after which, e.g., three channels in the form of doubly sloped angle sheet irons can be filled with a stack of articles 7 each and each stack of articles can be stabilized with a rolling cart on the top side according to the right-hand part of the drawing. The filled drawer is then returned into the bay. The bay is then adjusted vertically (or laterally) by means of a hand or foot switch such that the next free drawer will reach the working level. The pulling out and pushing in of the drawers as well as the adjustment of the bay in the vertical and/or lateral directions may also be performed automatically on the whole.

For the full automation of the acceptance department, provisions may also be made for mechanically aligning the articles emptied as bulk goods from a collective box, for reading them by a reading station, being checked by a batch control, being ordered in columns by a suitable machine and being delivered into the buffer.

Figure 19:
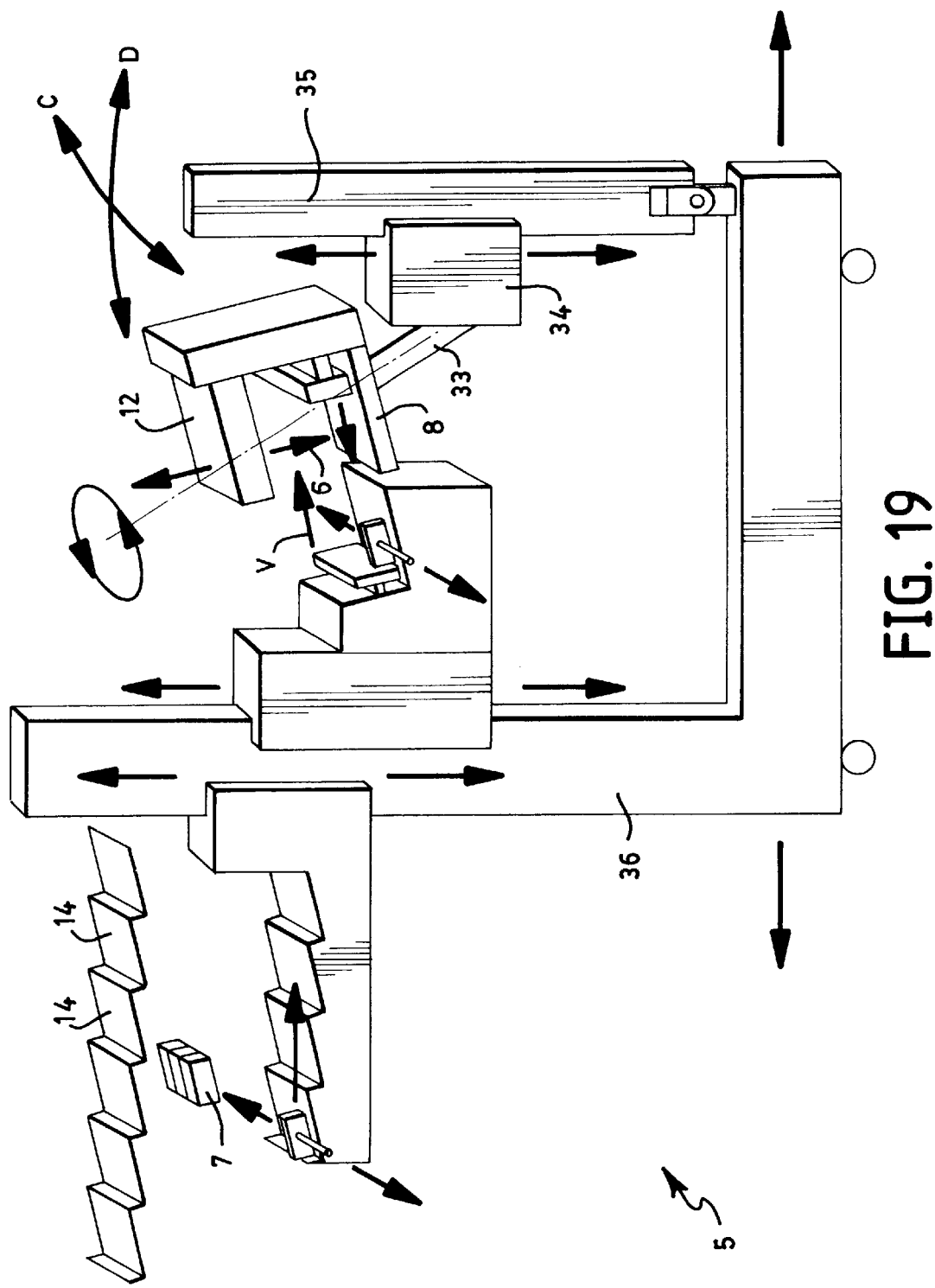
FIG. 19 is the bay-storage and retrieval unit according to FIG. 3 in a stack of articles-displacing position.

In the variant of a bay-storage and retrieval unit according to the present invention illustrated in FIGS. 3 and 19, the article-handling unit 6 is divided into two parts, namely, a separate, vertically adjustable stack-of-articles pick-up unit 28 with a plurality of angle sheet irons 14 of the type, position and size of the stack-of-articles pick-up 8 and of the supply bay, which has at least one adjustable, second longitudinal stack-of-articles pusher 29 of its own, wherein a plurality of stacks of articles 7 can be conveyed by the stack-of-articles pick-up unit 28 from the buffer 16 or from the stack-of-articles pick-up to the higher-level supply bay 15 as well as loaded and removed, and a separate, vertically adjustable article bay loading unit 30, which is in turn divided into two parts and has, on the one hand, a vertically adjustable single stack of articles pick-up 8' with the longitudinal stack-of-articles pusher 9 and with another, transverse stack-of-articles pusher 31 and, on the other hand, a gripping unit 32 movable in space with the bottom-side stack-of-articles pick-up 8', the longitudinal stack-of-articles clamping plate 12' and the adjustable transverse stack-of-articles pusher 10, wherein a single selected stack of articles 7' (optionally two or more parallel stacks of articles in the case of short articles) can be conveyed by the article bay loading unit 30 from the supply bay (higher-level supply bay 15, buffer 16) or from the stack-of-articles stacker plate 18 of the acceptance department E to the high-speed automatic turning unit 2 and be loaded into a selected, essentially vertical shaft of the article bay there.

For loading the stack of articles into the high-speed automatic turning unit 2, the stack of articles 7 can be removed by the individual stack-of-articles pick-up 8' from the supply bay in the longitudinal direction of the stack by displacement with the longitudinal stack-of-articles pusher 9, and after transfer or transverse displacement V of the stack of articles 7 from the individual stack-of-articles pick-up 8' by the additional transverse stack-of-articles pusher 31 to the bottom-side stack-of-articles pick-up 8' of the aligned gripping unit 32 and after clamping of the entire stack of articles in the transverse direction Q of the stack by the longitudinal clamping plate 12 having spring-tensioned fingers, it can be positioned at the selected shaft of the high-speed automatic turning unit 2 by the movement of the gripping unit and it can be loaded.

The gripping unit 32 is fastened via an axis of rotation 33 to a vertically adjustable lifting carriage 34, which is in turn vertically displaceable on a vertical bar 35 of the bay-storage and retrieval unit 5, which said bar is linked on the bottom side around two vertical axes C, D.

The vertical bar 35 has a shorter length than the vertical bar 36 on which the individual stack-of-articles pick-up 8' and the stack-of-articles pick-up unit 28 are vertically displaceable.

According to FIGS. 3 and 19, the combined goods storage and loading device can consequently remove article columns 7 from the acceptance department by means of the goods acceptance unit from obliquely positioned bays sloping toward the device. The stack is guided by the positioned pusher. This pusher also introduces the goods into the bay at the loading site. The pusher is displaceable over a plurality of stacks of articles and product cartons on the goods loading unit. The goods loading unit and the loading unit are vertically displaceable on the axis 36 up to a height of about 5.5 m. The device itself is rail-borne, is able to travel in curves and is guided directly on the bay rows and can travel, especially by means of controlled switches in short circuits and short circles, such that the entire warehouse area can be covered. The entire unit can be expanded by increasing the number of bay-storage and retrieval units.

The loading unit comprises essentially two components: The removing unit from the bay by means of pushers and the loading unit with a pivotable axis 35. The height to be loaded is approx. 2.5 m in the case of high-speed automatic turning units, i.e., the loading device does not necessarily have to travel up to the bottom of the highest bay to take over the goods. This is performed by the removing unit and by pushing off the goods removed into the gripper 32.

The storage removal unit performs positioning at the corresponding bay shaft, releases a brake and takes over the stack 7 onto the oblique plane by moving back the pusher 9. This unit then moves into the area of the loading unit, which is positioned before the stack of articles according to FIG. 19. This stack of articles is pushed with the pusher 31 into the gripper 32, and the rear stop is established by the displaceable plate or the transverse pusher 10. It is achieved due to this stop that the front edge of the article is always at the same point during loading, which substantially simplifies the positioning in the channel shaft.

After the take-over of the stack of articles, the gripper closes and pivots in the direction of the high-speed automatic turning unit. The axis 35 can be sloped in two directions, C and D, i.e., the device can adjust itself exactly to the slope of the high-speed automatic turning unit 2 by sloping this axis, even if it is sloped doubly, i.e., both in the direction of the aisle and at right angles to the aisle. This leads to a substantial simplification when the grasped stack of articles is placed on the article already present, because the movement of the axis can now be performed simply linearly and consequently easily.

The gripper 32 is fastened to a simple rotating axis 33. Coordinated movements in terms of continuous path control are not necessary during loading. Due to the possibility of pivoting the axis 35, mounting in a ball-and-socket joint, in two directions, C, D, at the lower part, the device can adjust itself to any existing or future automatic unit and can also be operated in mixed operation, i.e., it can load automatic units with vertical or oblique shafts in one row.

Even though doubly sloped angle sheet irons are particularly advantageous as the support and stacker plate for stacks, it is obvious that a simple slope of angle sheet irons or a horizontal arrangement is also possible if corresponding drives and fixing aids are provided for the stack of articles.

It should also be mentioned that the independently patentable features contained in the subclaims shall have corresponding independent protection despite the formal reference made to the principal claim. All the inventive features contained in the entire application document also fall within the scope of protection of the present invention.

While specific embodiments of the invention have been shown and described in detail to illustrate the application of the principles of the invention, it will be understood that the invention may be embodied otherwise without departing from such principles.

What is claimed is:

1. A commissioning unit, comprising:
   a high-speed automatic turning unit having an article bay with sloping article shafts, said article shafts being arranged next to one another, said article shafts being accessible from a front side and said article shafts defining a space in which articles to be commissioned can be stored;
   a traveling bay-storage and retrieval unit associated with said article bay for loading articles into said article shaft, said bay-storage and retrieval unit having motive means and being movable at least longitudinally and having an article-handling unit, said article-handling unit loading articles of a same brand and dimension stack by stack without a magazine, wherein a stack of the articles to be loaded is handled by said bay-storage and retrieval unit simultaneously without said magazine and said article-handling unit has a powered pick up means for bottom-side stack-of-articles pick-up, an adjustable longitudinal stack-of-articles pusher, an adjustable transverse stack-of-articles pusher with motive means therefor to move the stack into the space where the articles are stored and an adjustable longitudinal stack-of-articles powered clamping plate provided with a row of spring-tensioned fingers, said clamping plate being located in parallel and opposite said stack-of-articles pick-up and pushes, in a clamped state, the stack of articles picked up directly by said longitudinal stack-of-articles clamping plate with said spring-tensioned fingers of said clamping plate, in a transverse direction of the stack of articles against the stack-of-articles pick-up.

2. A commissioning unit in accordance with claim 1, wherein said bay-storage and retrieval unit can travel by means of a guide or rail system from and to at least one supply bay and can be positioned at a selected lateral end of a shaft of said supply bay, of an angle sheet iron, wherein a single stack of articles to be handled is or can be arranged in each selected shaft and the stack of articles reaches a selected aligned article pick-up of said article-handling unit by being displaced in a direction (S) of the stack or conversely, it reaches the selected shaft from the article pick-up, wherein the guide or rail system may also have switches.

3. The commissioning unit in accordance with claim 2, wherein said supply bay is a higher-level supply bay, which is associated with said high-speed automatic turning unit and is located in the vicinity of said article bay of said high-speed automatic turning unit, which is associated with an acceptance department and is located in the vicinity of an unpacking station, at which the stacks of articles are unpacked from a collective box and are put together.

4. The commissioning unit in accordance with claim 3, wherein the unpacked stacks of articles are put together on a stack-of-articles stacker plate, which has the shape of part of at least one bay level of the supply bay, and is formed especially by said angle sheet irons, wherein said bay-storage and retrieval unit can also be moved to the stack-of-articles stacker plate by means of said guide or rail system by displacement for taking over the stack of articles and can be positioned at the stack-of-articles stacker plate, especially at a lateral end (A) of one of the angle sheet irons, wherein the stack-of-articles stacker plate is preferably also displaceable for positioning at the bay-storage and retrieval unit, especially on a conveyor belt or on a chute, and/or it can be rotated around a vertical axis preferably by at least 90°.

5. The commissioning unit in accordance with claim 4, wherein said article-handling unit is a two-part unit and has a separate, vertically adjustable stack-of-articles pick-up unit with a plurality of said angle sheet irons of a type, location and size of said stack-of-articles pick-up and of said supply bay, which has at least one said adjustable second longitudinal stack-of-articles pusher, wherein a plurality of said stacks of articles can be delivered by said stack-of-articles pick-up unit from the stack-of-articles pick-up to the higher-level supply bay and can be loaded and removed, and it has a separate, vertically adjustable article bay loading unit, which is in turn a two-part unit and has, on the one hand, a vertically adjustable single stack-of-articles pick-up, optionally a plurality of single stack-of-articles pick-ups, with the longitudinal stack-of-articles pusher and with another said transverse stack-of-articles pusher and, on the other hand, a gripping unit movable in space with a bottom-side stack-of-articles pick-up, the longitudinal stack-of-articles clamping plate and with the adjustable transverse stack-of-articles pusher, wherein a single selected stack of articles can be delivered by the stack of articles loading unit from the supply bay and can be loaded into a selected, essentially vertical shaft of the article bay there.

6. The commissioning unit in accordance with claim 5, wherein for loading the stack of articles into the high-speed automatic turning unit, the stack of articles can be removed by an individual article pick-up from the supply bay in a longitudinal direction of the stack by displacement with the longitudinal stack-of-articles pusher and can be delivered to the high-speed automatic turning unit and, after transfer or said transverse displacement of the stack of articles from the individual stack-of-articles pick-up by the additional transverse stack-of-articles pusher to the bottom-side stack-of-articles pick-up of the aligned gripping unit and after clamping the entire stack of articles in the transverse direction of the stack by the longitudinal clamping plate provided with spring-tensioned fingers at the selected shaft of the high-speed automatic turning unit, it can be positioned and loaded by the movement of the gripping unit.

7. The commissioning unit in accordance with claim 6, wherein said gripping unit is fastened via an axis of rotation at a vertically adjustable lifting carriage, which is in turn vertically displaceable on a vertical bar of the bay-storage and retrieval unit, which said vertical bar is articulated on a bottom side around two said axes, which are at right angles to one another, wherein the vertical bar preferably has a shorter length than the vertical bar, on which the individual stack-of-articles pick-up and the stack-of-articles pick-up unit are vertically displaceable.

8. The commissioning unit in accordance with claim 6, wherein for loading a stack of articles into the high-speed automatic turning unit after the positioning of the stack of articles handling unit before the selected shaft of the article bay, the stack of articles is released in the clamped state by the transverse stack-of-articles pusher into the shaft, optionally onto the topmost article present there.

9. The commissioning unit in accordance with claim 3, wherein said stack-of-articles pick-up of said bay-storage and retrieval unit, said shaft and said angle sheet iron of said higher-level supply bay, said buffer and said stack-of-articles stacker plate at an acceptance department have the same designs in terms of length, slope, longitudinal slope (a), and transverse slope (b)).

10. The commissioning unit in accordance with claim 2, wherein said supply bay has said angle sheet irons arranged next to one another in planes arranged one on top of another, and each said angle sheet iron is sloped doubly and forms a groove, which has a rectangular cross section and is oblique in a longitudinal direction, wherein a root of the angle is located at the deepest point in each longitudinal cross section of the groove and two surfaces of legs of the angle are stop faces for a picked-up stack of articles, and a detachable article stop is, furthermore, provided at the deepest end of the groove.

11. The commissioning unit in accordance with claim 10, wherein a stack of articles picked up in the groove has a longitudinal fixing aid, which pushes the stack of articles against the article stop, wherein the longitudinal fixing aid is preferably one of a rolling cart, a longitudinally adjustable, driven article stop or a spring-pretensioned article stop.

12. The commissioning unit in accordance with claim 2, wherein said article-handling unit is fastened via a pivot axis to a carriage, said carriage being transversely displaceable on a transverse rail with a slope of the shaft depth and in the longitudinal direction of the shaft of the supply bay, equaling about 20°, wherein said transverse rail is fastened to a vertically displaceable lifting carriage of said bay-storage and retrieval unit.

13. The commissioning unit in accordance with claim 1, wherein said article-handling unit of said bay-storage and retrieval unit has a coupling pin, which can be caused to engage as a centering aid in a corresponding recess at a selected shaft of a supply bay, and said article-handling unit has a stop comprising a small roller, which stop can be caused to engage a stack-of-articles stop of a shaft for releasing or depressing the stack-of-articles stop, wherein the stop of the article-handling unit may also be the adjustable longitudinal stack-of-articles pusher itself.

14. The commissioning unit in accordance with claim 1, wherein at least one separate bay-storage and retrieval unit is provided, which is associated with the stack-of-articles stacker plate at the acceptance department, with the higher-level bay/bays and is displaceable thereto and can take over said stacks of articles there, wherein the separate bay-storage and retrieval unit has exclusively a stack-of-articles pick-up, preferably a multiple load pick-up means for a plurality of said stacks of articles and does not have a article bay loading unit, which is associated with the high-speed automatic turning unit, and the separate bay-storage and retrieval unit may optionally also be operated in a commissioning unit not belonging to this type.

15. A process for providing and loading articles in a commissioning unit with a high-speed automatic turning unit having an article bay with sloping article shafts arranged next to one another, the article shafts being accessible from a front side and defining spaces in which articles to be commissioned can be stored, a traveling bay-storage and retrieval unit having motive means associated with the article bay which can be positioned at each article shaft and can load articles into the article shaft during the operation of the commissioning unit, the process comprising the steps of:

removing articles of the same brand and size, with the bay-storage moved in space and with the retrieval unit, from a stack-of-articles stacker plate at the acceptance department in a stack prepacked without a magazine there essentially by the horizontal displacement of the stack of articles in the longitudinal direction of the stack, gently sloping downward in the longitudinal direction, toward the bay-storage and retrieval unit and gently sloping laterally in the transverse direction against a stop;

transferring the stack of-articles removed by the bay-storage and retrieval unit essentially in horizontal arrangement on the bay-storage and retrieval unit to the high-speed automatic turning unit;

clamping the stack of articles in the transverse direction of the stack directly in a stack of articles handling unit before the vertical positioning of a stack of articles at a selected article shaft; and after positioning in a deposition position, releasing the clamped stack of articles from or pushing out the clamped stack of-articles of the clamping in a selected shaft of the high-speed automatic turning unit.

16. A process according to claim 15, further comprising: loading articles at another supply bay during said step of removing articles.

* * * * *